US011225873B2

United States Patent
Koenig et al.

(10) Patent No.: US 11,225,873 B2
(45) Date of Patent: Jan. 18, 2022

(54) COMBUSTION TURBINE VANE COOLING SYSTEM

(71) Applicant: Rolls-Royce Corporation, Indianapolis, IN (US)

(72) Inventors: Eric Koenig, Fishers, IN (US); Brett Barker, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 16/741,609

(22) Filed: Jan. 13, 2020

(65) Prior Publication Data

US 2021/0215051 A1 Jul. 15, 2021

(51) Int. Cl.
*F01D 5/18* (2006.01)

(52) U.S. Cl.
CPC .................................. *F01D 5/188* (2013.01)

(58) Field of Classification Search
CPC ........................................................ F01D 5/18
See application file for complete search history.

(56) References Cited

U.S. PATENT DOCUMENTS

| 4,312,625 A | 1/1982 | Pinaire |
| 5,848,876 A | 12/1998 | Tomita |
| 5,980,202 A | 11/1999 | Tomita et al. |
| 6,945,749 B2 | 9/2005 | De Cardenas |
| 7,416,391 B2 | 8/2008 | Veltre et al. |
| 8,231,348 B2 | 7/2012 | Torii et al. |
| 2012/0107134 A1* | 5/2012 | Harris, Jr. .............. F01D 5/18 416/97 R |
| 2013/0171005 A1* | 7/2013 | Ellis ...................... F01D 5/187 416/97 R |
| 2014/0023483 A1* | 1/2014 | Wiebe .................... F01D 5/18 415/115 |
| 2014/0064984 A1* | 3/2014 | Zhang .................... F01D 5/18 416/97 R |
| 2015/0252673 A1* | 9/2015 | VanTassel ............. F01D 11/24 416/97 R |
| 2015/0377032 A1* | 12/2015 | Lewis .................... F23R 3/06 60/755 |

(Continued)

FOREIGN PATENT DOCUMENTS

EP 0 866 214 A2 9/1998

*Primary Examiner* — Justin D Seabe
*Assistant Examiner* — Ryan C Clark
(74) *Attorney, Agent, or Firm* — Crowell & Moring LLP

(57) ABSTRACT

A system includes an air foil positionable in a combustion flow path of a combustion turbine. A shank may be integrally formed with the air foil, and the platform may be integrally formed with the shank. The platform includes linear fluid passageways, access ducts penetrating a wedge face surface of the platform, and outlet apertures formed in a radially outward surface of the platform. The outlet apertures are in fluid communication with respective linear fluid passageways such that fluid flowing through the respective linear fluid passageways is discharged from the outlet apertures into the combustion flow path. The platform also includes plugs is disposed in respective access ducts to form a fluid tight seal and be positioned in at least one of the respective linear fluid passageways. Fluid flowing through the respective linear fluid passageways flows away from a respective plug for discharge from a respective outlet aperture.

19 Claims, 12 Drawing Sheets

(56) References Cited

U.S. PATENT DOCUMENTS

| | | | |
|---|---|---|---|
| 2016/0017720 A1* | 1/2016 | Lewis | F01D 5/187 416/1 |
| 2016/0108738 A1* | 4/2016 | Devore | F01D 25/12 415/177 |
| 2016/0177782 A1* | 6/2016 | Hough | F01D 5/12 415/115 |
| 2017/0145923 A1* | 5/2017 | Spangler | F01D 5/08 |

* cited by examiner

COMBUSTION TURBINE VANE COOLING SYSTEM

TECHNICAL FIELD

This disclosure relates to combustion turbines and, in particular, to combustion turbine vane cooling systems.

BACKGROUND

Gas turbine engines generate large amounts of internal heat due to combustion processes. As a result, engine components, such as turbine blades, may experience high thermal loads. These high thermal loads may affect the engine components.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Described herein are examples of a turbine vane cooling system disclosing arrangements and methods for cooling turbine blade platforms. In an example, the system includes a platform integrally formed in a turbine blade. The platform may include linear fluid passageways through the platform, access ducts penetrating a wedge face surface of the platform, and outlet apertures formed in a radially outward surface of the platform. Fluid flow through the linear fluid passageways of the platform may be discharged from the outlet apertures. The platform may also include plugs. Each of the plugs may be disposed in one of the access ducts to form a fluid tight seal. Fluid flowing through the linear fluid passageways flows away from a respective plug before discharging from an outlet aperture into the combustion flow path.

One interesting feature of the systems and methods described may be that the cooling system may be completed after the turbine blade is formed. The cooling system may be, for example, formed at least partially by mechanical material removal. Thus, the system may advantageously lower manufacturing costs and/or allow for flexibility when positioning the linear fluid passageways. The cooling system may, additionally or alternatively, be formed at least partially by additive layer manufacturing (ALM) in order to create complex shapes for the cooling system. In one example, the access ducts and/or linear fluid passageways may be formed with ALM to leave openings along the wedge face surface for tool access, for example a tool for a milling operation. The milling operation may clean up and/or smooth the surfaces of the cooling system, for example the linear fluid passageways, and the plug could then be added. Thus, the system may advantageously decrease machining time because the geometry of the cooling system after ALM would be close to the final desired shape of the cooling system.

Surface roughness of surfaces formed by ALM may be relatively higher than surface roughness of surfaces formed by mechanical removal processes, such as drilling. In one example, a region of the linear fluid passageway closest to the wedge face surface may be smoothed via a mechanical removal processes, for example, a milling operation, and a portion of the linear fluid passageway farthest from the wedge face surface could be left rough. Advantageously, the smoother region of the linear fluid passageway closest to the wedge face surface would have lower heat transfer and lower pressure drop. Thus, the cooling system may advantageously delay cooling until it reaches the target location. Alternatively or additionally, for a purely mechanical material removal process, artificial roughness could be added as needed to enhance heat transfer.

Figure 1:
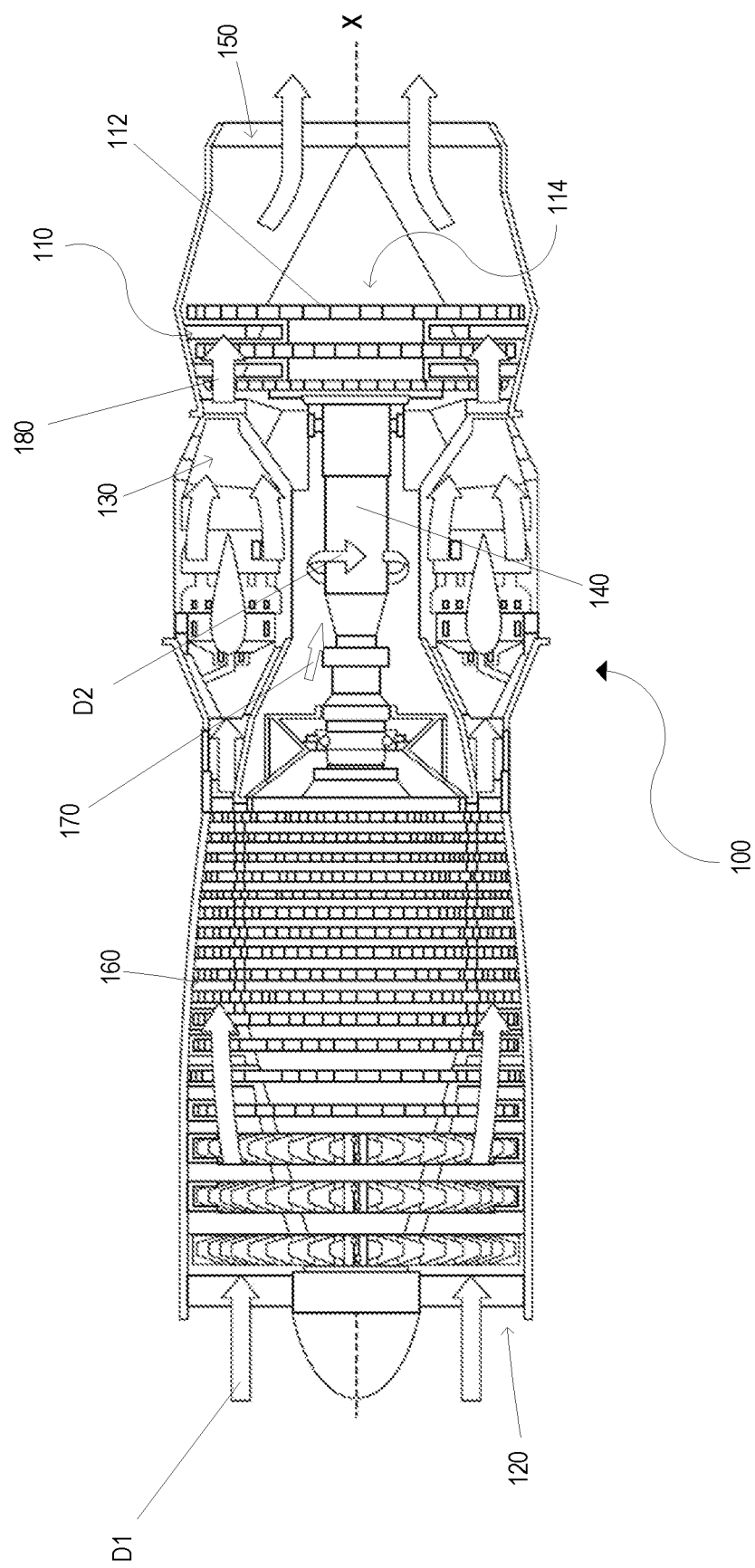
FIG. 1 shows an example of a gas turbine engine.

FIG. 1 shows an example of a gas turbine engine 100. The gas turbine 100 may be used for flight operations, for example in aircraft. The term aircraft, for example, may include helicopters, airplanes, missiles, unmanned devices, and any other similar device. The gas turbine engine 100 may alternatively be used in other vehicles or industrial applications, for example oil production and transmission, electrical generation, propulsion operations, or any similar application. The gas turbine engine 100 may include an intake section 120, a compressor section 160, a combustion section 130, a turbine section 110, and an exhaust section 150. There are various ways the gas turbine engine 100 sections may be linked together. Additional sections or engine components may also be added such as intercoolers.

During operation of the gas turbine engine 100, fluid, such as air, received from the intake section 120 travels along the direction D1 and may be compressed within the compressor section 160 to produce primary compressed fluid and compressed secondary fluid. The compressed primary fluid (such as primary air) may then flow to the combustion section 130. Fuel may be directed into the combustion section to mix with the primary fluid. The mixture may be ignited and then combustion fluid passes through the turbine section 110 along the combustion flow path 180. The energy from the combustion of the fuel and fluid mixture may cause a turbine shaft 140 of a combustion turbine 114 to rotate, which in turn drives the compressor section 160. The compressor section 160 may provide the compressed secondary fluid (such as secondary air) to different parts of the gas turbine engine 100 other than the combustion section 130. For example, at least part of the secondary fluid may flow through the gas turbine engine 100 as secondary air 170. The secondary air 170 may be used in the gas turbine engine 100 for purposes other than combustion, for example cooling purposes. The secondary air 170 may flow through dedicated passages to different sections or components of the gas turbine engine 100. The secondary air 170 may also be directed in other ways to flow through the gas turbine engine 100 to different sections or components. In an example, the secondary air 170 may flow to the turbine section 110. The secondary air 170 may be used for cooling in the turbine section 110.

The turbine section includes a plurality of blades 112 coupled to a rotor disk affixed to the shaft 140. The blades 112 are joined to the rotor disk. The blades 112 may be configured to rotate around a central axis X of the gas turbine engine 100. The blades 112 may be made of a ridged material, for example the blades 112 may be made of a ceramic material, alloy, or superalloy. Additionally, the blades 112 may be coated, such as with a thermal barrier coating (TBC) and/or a protective coating. As the fluid, in the form of combustion fluid, flows along the combustion flow path 180, the combustion fluid passes between the plurality of adjacent blades 112 and causes the combustion turbine 114 to rotate. The rotating combustion turbine 114 may turn the shaft 140 in a rotational direction D2, for example. In addition, or alternatively, in other examples, the blades 112 may be part of a static vane assembly in the turbine section 110 of the gas turbine engine 100.

Figure 2:
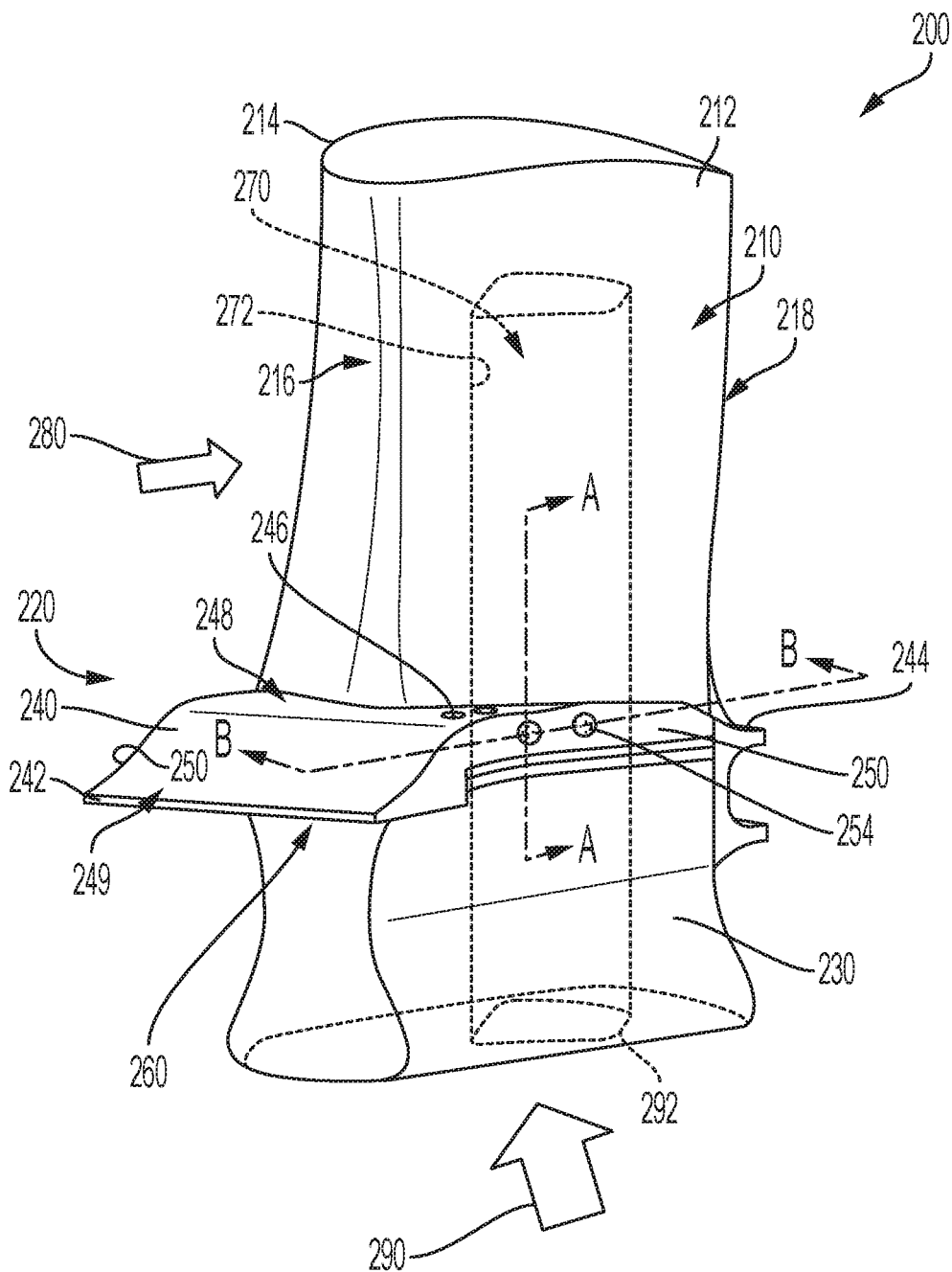
FIG. 2 shows an example blade for a gas turbine engine.

FIG. 2 shows an example blade 200. The blade 200 may be joined to the rotor disk affixed to the shaft 140 of the combustion turbine 114. The blade 200 may include an airfoil 210, a shank 230, and a platform 220. The airfoil 210, shank 230, and platform 220 may be formed together as a monolithic unitary structure through a forming processes, for example through a casting process. The airfoil 210, shank 230, and platform 220 may alternatively be joined together through conventional joining methods, such as welding or brazing.

The platform 220 may be made of similar or the same material as the blade 200, or a different material. The platform 220 may be made of a rigid material such as a ceramic material, alloy, or superalloy. The platform 220 may be coated. The platform 220 includes a radially outward surface 240, a radially inward surface 260, and wedge face surfaces 250.

The radially outward surface 240 may be a radially outward facing generally planar surface of the platform 220 that extends away from airfoil 210 to peripheral edges defined by the wedge face surfaces 250, a leading peripheral edge 242 and a trailing peripheral edge 244 of the platform 220. The radially outward surface 240 of the platform 220 may be coupled to, or otherwise contiguously adjacent to the airfoil 210 such that the airfoil 210 extends generally perpendicular away from the radially outward surface 240. In an example, the airfoil 210 may be integrally formed with the platform 220. The radially outward surface 240 is in fluid communication with a combustion flow path 280. The radially outward surface 240 may contain a plurality of outlet apertures 246 in a collar area 248 of the radially outward surface 240 surrounding the airfoil 210. The collar area 248 may extend from the airfoil 210 outwardly to the wedge face surfaces 250, to the trailing edge 244, and to an oblique area 249 of the radially outward surface 240 that extends between the collar area 248 and the leading peripheral edge 242.

The combustion flow path 280 may be over the blade 200. For example, the combustion flow path may flow over the airfoil 210 in a direction from the leading edge 216 to the trailing edge 218. The combustion flow path 280 may also flow over the platform 220. For example, the combustion flow path 280 may flow over the radially outward surface 240. For example, the combustion flow path may flow over the collar area 248 and the oblique area 249 in a direction from the leading peripheral edge 242 to the trailing peripheral edge 244.

The radially inward surface 260 of the platform 220 is opposite to, or an opposing surface with respect to, the radially outward surface 240 of the platform 220. The radially inward surface 260 may be a radially inward facing generally planar surface of the platform 220 that extends away from airfoil 210 to peripheral edges defined by the wedge face surfaces 250, the leading peripheral edge 242 and the trailing peripheral edge 244 of the platform 220. The radially inward surface 260 of the platform 220 may be coupled to, or otherwise contiguously adjacent to the shank 230.

In an example, the shank 230 may be integrally formed with the platform 220. The radially inward surface 260 may be in fluid contact, or fluid communication, with secondary air 290. The wedge face surfaces 250 of the platform 220 may be generally planar opposing side walls of the platform 220 defining peripheral edges of both the radially outward surface 240 and the radially inward surface 260. The wedge face surfaces 250 of the blade 200 may be parallel, or flush to, or abutting, the wedge face surfaces 250 of adjacent blades 200 in the turbine section 114 (FIG. 1). The sidewalls formed by the wedge face surfaces 250 may contain a passageway access area 254. The passageway access 254 area may enable access to an interior of the platform 220 by penetration into the wedge face surface 250 such as by including a depression of some shape into the wedge face surface 250.

The airfoil 210 may be a section of the blade 200 extending away from the platform 220 and coupled, or otherwise contiguously adjacent to the radially outward surface 240 of the platform 220. The air foil 210 may include a pressure side 212, a suction side 214, a leading edge 216, and a trailing edge 218. The airfoil 210 may be made of the same material as the blade 200 or a different material. The airfoil 210 may be made of a rigid material such as a ceramic material, alloy, or superalloy. The airfoil 210 may be coated. Combustion fluid, such as combustion gases, is directed towards the leading edge 216 of the airfoil 210 and the leading edge 242 of the platform 220 as the fluid flows along the combustion flow path 280. (FIG. 1) The energy from the combustion fluid flows over the airfoil 210 in order to rotate the turbine shaft of the combustion turbine 114. The blade 200 may be hollow and include an interior wall 272. The interior wall 272 may form a cooling passage 270 that extends through at least a portion of the length of the blade 200. The cooling passage 270 may include one or more bores, ducts or apertures, and may extend from the shank 230, through the platform 220 to the airfoil 210. The cooling passage 270 may be supplied with secondary air 290. The secondary air 290 may be supplied through an opening 292 formed at the radially inward end of the shank 230. In other examples, the opening 292 may be formed in other areas of the shank 230. The cooling passage 270 may be formed through a forming process, such as casting.

A radially outward end of the shank 230 may be coupled or otherwise contiguously adjacent to the platform 220 at the radially inward surface 260 of the platform 220. The shank 230 and the airfoil 210 may be on opposing sides of the platform 220 such that the shank 230 and the airfoil 210 are on opposite sides of the platform 220. The shank 230 may be made of the same material as the blade 200 or of a different material. The shank 230 may be made of a rigid material such as a ceramic material, alloy, or superalloy. The shank 230 may be coated. The shank 230 may include grooves or other features in order to couple the blade 200 with the rotor disk. The shank 230 may be hollow and/or include one or more bores, ducts or apertures as part of the cooling passage 270 to provide a route for secondary air 290 to flow to the airfoil 210. Secondary air 290 may flow adjacent to the shank 230 in fluid communication with the radially inward surface 260 of the platform 220.

Figure 3:
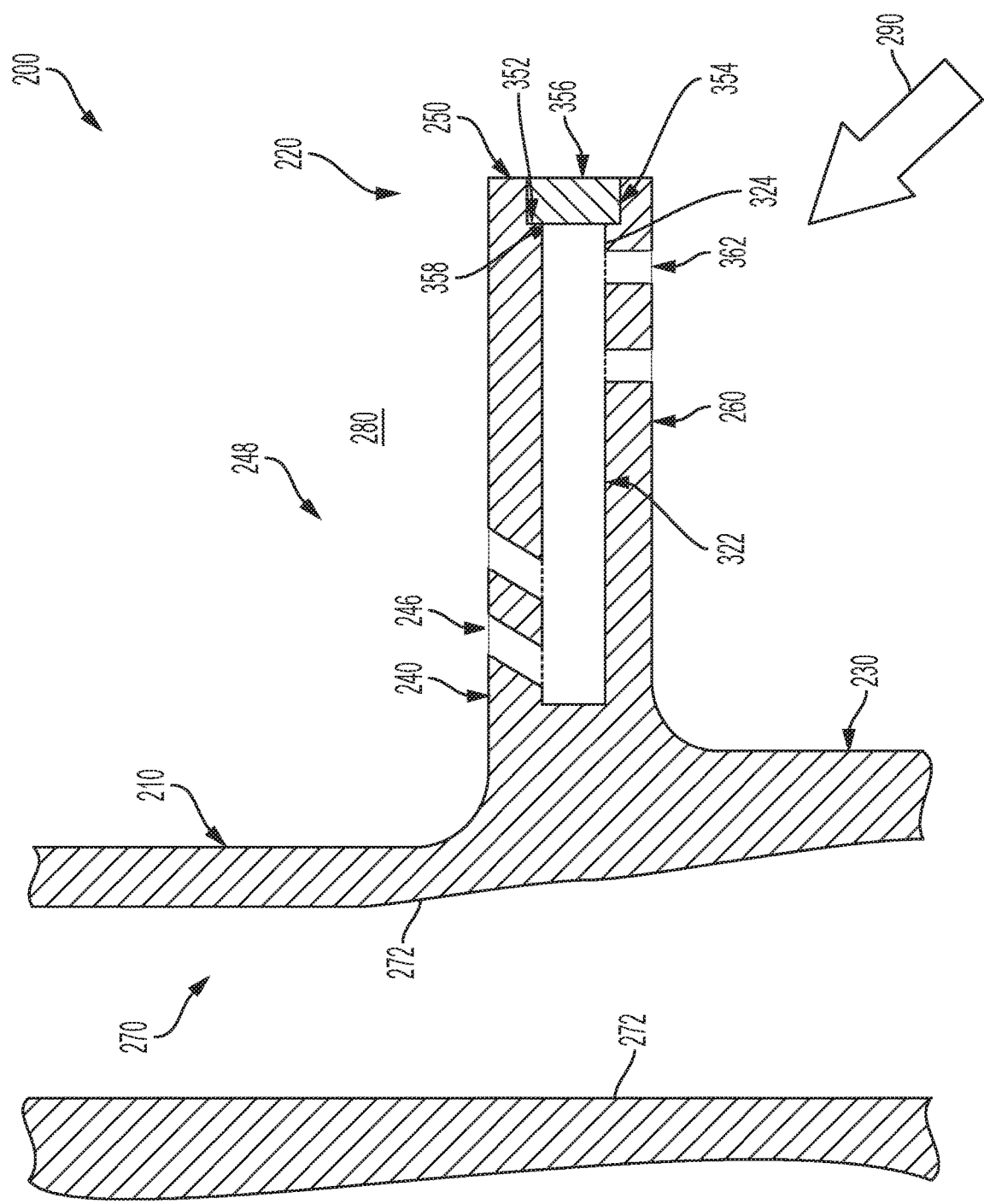
FIG. 3 illustrates a section view of an example of a portion of a blade taken on section line A-A in FIG. 2.

FIG. 3 illustrates a section view of an example of a portion of a blade 200 taken on section line A-A in FIG. 2. The blade 200 includes the airfoil 210, the shank 230, and the platform 220. The airfoil 210 may contain the cooling passage 270. The platform 220 comprises the radially outward surface 240, the radially inward surface 260, and the wedge face surface 250. The wedge face surface 250 may include a number of access ducts 354 in the passage access area 254 (FIG. 2).

The access ducts 354 may be depressions in the wedge face surface 250. Alternatively, the access ducts 254 may penetrate the wedge face surface 250. The access ducts 354 may extend into the platform 220 away from the wedge face surface 250. The access ducts 354 may penetrate the wedge face surface 250 and extend into the platform 220 a predetermined distance from the wedge face surface 250. The access ducts 354 may be a certain shape, for example, round, rectangular, or oval in shape. The access ducts 354 may extend into the platform 220 perpendicular to the wedge face surface 250 or at an angle to the wedge face surface 250.

The access ducts 354 may be created by a mechanical material removal process, such as by drilling into the wedge face surface 250, or by another mechanical material removal process, such as a chemical or electrical (plasma, laser and the like). In other examples, the access ducts 354 may be formed during a formation process such as casting. The access ducts 354 may be created by mechanical material removal in order to lower manufacturing costs and/or provide flexibility in placement along the wedge face surface 250. The access ducts 354 may provide temporary access to an interior of the platform 220 so that linear passageways may be created during manufacturing of the blade 200. Additionally or alternatively, the access ducts 354 may be created by ALM and/or a combination of ALM and a mechanical material removal process. The access ducts 354 may be created by ALM to decrease machining time.

Each of the access ducts 354 may be formed with a predetermined cross-sectional area capable of being sealed by a respective plug 356. Each of the plugs 356 may be disposed in a respective access duct 354 so as to be located in the wedge face surface 250. The plugs 356 may create a fluid tight seal in each of the respective access ducts 354. The plugs 356 may be positioned in respective access ducts 354 to be flush with the wedge face surface 250. Each of the plugs 356 may be formed and/or sealed in a respective access duct 354 by a manufacturing process, for example, welding or brazing. For example, the plugs 356 may be a separate part, such as a block or fill material, that may be inserted and fixedly held in a respective access duct 354 to create a fluid tight seal. Additionally or alternatively, the wedge face surface 250 may be sealed by an additional feature that sits on top of the wedge face surface 250 and/or a manufacturing process. For example, the wedge face surface 250 may be sealed by brazing or by welding a plate over the access ducts 354.

The platform 220 may include one or more linear fluid passageways 322 extending through the platform 220 away from the access ducts 354. Multiple linear fluid passageways 322 may extend from one access duct 354. Alternatively, a single linear fluid passage way 322 may be axially aligned to extend away from a single respective access duct 354. The linear fluid passageways 322 may extend through the platform 220, in a direction away from the access duct 354, towards the airfoil 210. The linear fluid passageways 322 may extend through the platform 220, away from the access duct 354, perpendicular to the wedge face surface 250. The linear fluid passageway 322 may extend through the platform 220 at a predetermined angle with respect to the wedge face surface 250. The linear fluid passageways 322 may extend through the platform 220 between the radially outward surface 240 and the radially inward surface 260. The linear fluid passageways 322 may extend through the platform 220 parallel to the radially outward surface 240 and/or parallel to the radially inward surface 260. The linear fluid passageways 322 may extend through the platform 220 away from the access duct 354 at a predetermined angle with respect to the wedge face surface 250 towards the radially outward surface 240 or radially inward surface 260. The linear fluid passageways 322 may extend through the platform 320 parallel to the combustion flow path 280. (FIG. 2)

The linear fluid passageways 322 may be formed by a mechanical material removal process, such as drilling or other mechanical removal process occurring within a respective access duct 322. Alternatively, or in addition, some of the linear fluid passageways 322 may be formed through a formation process such as casting. The linear fluid passageways 322 may be formed by mechanical material removal in order to lower manufacturing costs and/or increase flexibility of positioning of respective passageways 322. The linear fluid passageways 322 may be formed by, for example, drilling into the platform 220 through the access duct 354. Thus, in this example, the linear fluid passageways 322 may be round with a predetermined diameter that is equal to, or smaller than the respective access duct 354. In examples, the access duct 354 may have a larger cross sectional area than a respective linear fluid passageway 322 such that shoulders 352 are present at a junction between the access duct 354 and a respective linear fluid passageway 322. In these examples, the shoulders 352 may provide a stop that limits protrusion of a respective plug 356 into a respective linear fluid passageway 322. Additionally or alternatively, the linear fluid passageways 322 may be created by ALM and/or a combination of ALM and a mechanical material removal process. The linear fluid passageways 322 may be created by ALM to decrease machining time.

Each linear fluid passageway 322 may have a continuous inner surface providing a sealed duct for the flow of fluid. At least some of the linear fluid passageways 322 may be sealed at a proximate end by a respective plug 356 to form a closed end 324 of the linear fluid passageway 322. The closed end 324 of the linear fluid passageways 322 may be formed by an inner surface 358 of a respective plug 356 position at the end of the linear fluid passageway 322 in the access duct 354. The linear fluid passageways 322 may be sealed by the plugs 356 positioned in the access ducts 354 from which the linear fluid passageways 322 extend. Multiple linear fluid passageways 322 may be sealed by the same plug 356. Alternatively, a single plug 356 may seal a single linear fluid passageway 322. The linear fluid passageways 322 may create a flow path for a fluid, such as air. The linear fluid passageways 322 may create a flow path where fluid, such as air, flows through the linear fluid passageways 322 past the inner surface 358 and away from the plugs 356 toward the outlet apertures 246.

The radially inward surface 260 may include a plurality of inlet apertures 362. The inlet apertures 362 may penetrate the radially inward surface 260. The inlet apertures 362 may extend from the radially inward surface 260 to the linear fluid passageways 322. The inlet apertures 362 may be axially aligned to extend towards the linear fluid passageways 322 perpendicular to the radially inward surface 260. Alternatively, the inlet apertures 362 may be axially aligned to extend towards the linear fluid passage ways 322 at an angle with respect to the radially inward surface 260. The inlet apertures 362 may be circular in shape with a predetermined diameter that are the same or different. The inlet apertures 362 may be axially aligned to be angled with respect to the radially inward surface 260 such that an elliptical aperture is formed in the radially inward surface 260 by the inlet apertures 362. The elliptical apertures may be formed with a predetermined width that is less than a predetermined height. In other examples, other shapes of the inlet apertures 362 may be formed in the radially inward surface 260.

Each of the inlet apertures 362 may be in fluid communication with one or more of the linear fluid passageways 322. The inlet apertures 362 may also be in fluid communication with the secondary air 290. Secondary air 290 may flow through the inlet apertures 362 into the linear fluid passageways 322. The inlet apertures 362 may be formed by a mechanical material removal process, such as drilling, or some other mechanical removal process. Some of the inlet apertures 362 may be formed by a forming process such as casting. The inlet apertures 362 may be formed by a mechanical removal process in order to lower manufacturing costs and/or provide flexibility in placement on the radially inward surface 260. Additionally or alternatively, the inlet apertures 362 may be created by ALM and/or a combination of ALM and a mechanical material removal process. The inlet apertures 362 may be created by ALM to decrease machining time.

The collar area 248 of the radially outward surface 240 of the platform 220 may include the outlet apertures 246. The outlet apertures 246 may penetrate the radially outward surface 240. The outlet apertures 246 may extend from the radially outward surface 240 to the linear fluid passageways 322. The outlet apertures 246 may be axially aligned to extend towards the linear fluid passageways 322 perpendicular to the radially outward surface 240. Alternatively, the outlet apertures 246 may be axially aligned to extend towards the linear fluid passageways 322 at a predetermined angle with respect to the radially outward surface 240. The outlet apertures 246 may be circular in shape with a predetermined diameter which may be the same or different. The outlet apertures 246 may be axially aligned to be angled with respect to the radially outward surface 240 such that an elliptical aperture is formed in the radially outward surface 240 by the outlet apertures 246. The elliptical apertures may be formed with a predetermined width that is less than a predetermined height. In other examples, other shapes of the outlet apertures 246 may be formed in the radially outward surface 240. Each of the outlet apertures 246 may be in fluid communication with one of more of the linear fluid passageways 322. The outlet apertures 246 may also be in fluid communication with the combustion flow path 280.

During operation, fluid, such as air, for example the secondary air 290, may flow through the linear fluid passageways 322 and discharge from respective outlet apertures 246. The fluid, or secondary air 290, may flow through the linear fluid passageway 322 such that that the secondary air 290 flows away from the plugs 356 and discharges from the outlet apertures 246. The fluid or secondary air 290 may cool the platform 220 by flowing through the linear fluid passageways 322. The secondary air 290 may be discharged from the outlet apertures 246 into the combustion flow path 280. In addition, the secondary air 290 may be discharged from the outlet apertures 246 such that a fluid film of cooling air is created by the discharged air over the radially outward surface 240. The outlet apertures 246 may be angled to create a longer hole in the radially outward surface 240 so that a film is created. The outlet apertures 246 may be formed by a mechanical material removal process, such as drilling, or some other mechanical removal process, or a formation process such as casting. The outlet apertures 246 may be formed by a mechanical removal process in order to lower manufacturing costs and provide flexibility in placement on the radially outward surface 240. The outlet apertures 246 may be at an angle to the radially outward surface 240 to enable ease of manufacturing or drilling. Additionally or alternatively, the outlet apertures 246 may be created by ALM and/or a combination of ALM and a mechanical material removal process. The outlet apertures 246 may be created by ALM to decrease machining time.

FIGS. 4-12 illustrates a section view of various exemplary embodiments of a portion of a blade 200 taken on section line B-B in FIG. 2 through platform 220. The features and functionality described herein, including with respect to FIGS. 1-3, are fully applicable to the following embodiments and examples unless otherwise indicated. Accordingly, such features and functionality are interchangeable and combinable among the various examples described. In the embodiments of FIGS. 4-12, the linear fluid passageways 322 may be linear, that is extending along a straight line, such that fluid flowing within or through a linear fluid passageway 322 does not substantially change direction. In examples, the linear fluid passageways 322 may be interconnected linear passageway segments forming a fluid passageway to distribute cooling fluid within the platform 220. Fluid, for example secondary air 290, may flow through one or more linear fluid passageways 322 from the inlet aperture 362 to the outlet aperture 246 and cool the platform by convection of the heat from the platform 220 into the secondary air 290. Thus, the linear fluid passageways 322 may be formed in the platform 220 in locations to optimize cooling.

The linear fluid passageways 322 forming segments in a fluid passageway may have the same or different predetermined cross-sectional areas. For example, where the linear fluid passageways 322 are circular, different segments may have the same predetermined diameter, or varying predetermined diameters. Varying predetermined diameters may be present where different fluid flow rates are warranted, or where different fluid resistances, or drag are being avoided or compensated or where varying levels of cooling are warranted. For example, where there are multiple linear fluid passageways 322 aligned and coupled sequentially in multiple directions creating turns or bends that change the angular direction of the flow of fluid, the linear fluid passageways of different segments may become progressively smaller. In another example, where each of a number of sequentially coupled linear fluid passageways are segments which include one or more outlet apertures 246, larger diameter linear fluid passageways 322 may be used to achieve more uniform flow of liquid from the outlet apertures 246 of the various segments. Additionally or alternatively, the structure of each linear fluid passageway 322 may vary from the structure of another linearly fluid passageway 322.

Additionally or alternatively, the diameter of the linear fluid passageways 322 may be largest at an end of the linear fluid passageway 322 closest to the wedge face surface 250 and the diameter of the linear fluid passageway 322 may decrease going away from the wedge face surface 250. For example, the linear fluid passageway 322 may be formed by a mechanical removal process, or by a combination of ALM and a mechanical removal process, wherein the mechanical removal process includes making one or more countersunk holes. For example, a first hole with a first diameter may be drilled along the total length of the linear fluid passageway 322, and then a second hole with a second diameter could be drilled coaxially with the first hole along a partial length of the linear fluid passageway 322. In one example, the second diameter of the second hole may be larger than the first diameter of the first hole.

Each of the one or more linear fluid passageways 322 may include a first end 422 and a second end 424. The first end 422 may be disposed at an opposite end of the linear fluid passageway 322 from the second end 424. Fluid, such as secondary air 290, may flow from the first end 422 to the second end 424 of the linear fluid passageways 322 as the fluid flows from the inlet apertures 362 to the outlet apertures 246 of the fluid passageway. Accordingly, fluid flow within a respective a linear fluid passageway 322 flows along a flow vector between the first end 422 and the second end 424. Fluid flow in sequentially connected linear fluid passageways 322 may flow along different respective flow vectors where the sequentially connected linear fluid passageways 322 are oriented in different directions within the platform 220. The first end 422 or second end 424 of the linear passageway segments 322 may be disposed at the closed end 324 of the linear fluid passageway 322.

The linear fluid passageways 322 may be formed by a mechanical removal process, such as drilling, or a combination of ALM and a mechanical removal process. The formation of the linear fluid passageways 322 may be limited by the area of the access duct 354. Formation of the linear fluid passageways 322 may be constrained to an internal area of the platform 220 accessible through the access duct 354, wherein the linear fluid passageways 322 may be formed by mechanically removing material in a linear path originating from the access duct 354. The formation of the linear fluid passageways 322 may also be constrained by the cross sectional area of the access duct 354 and the cross sectional area of the linear passageway segment 322.

FIGS. 4-7 illustrate exemplary embodiments wherein some of the linear fluid passageways 322 may include one or more inlet apertures 362. The one or more inlet apertures 362 may be disposed in the radially inward surface 260 at a first end 422 of one or more linear fluid passageways 322 to receive cooling fluid, such as secondary air 290. At least some of the linear fluid passageways 322 illustrated in FIGS. 4-7 may include outlet apertures 246. The outlet apertures 246 may be disposed in the radially outward surface 240 at a second end 424 of one or more of the linear fluid passageways 322. In some examples, the linear fluid passageways 322 may include only inlet apertures 362, only outlet apertures 246, a combination of inlet apertures 362 and outlet apertures 246, or no apertures. The inlet apertures 362 or the outlet apertures 246 may be disposed at the closed end 324 of each of the linear fluid passageways 322.

Figure 4:
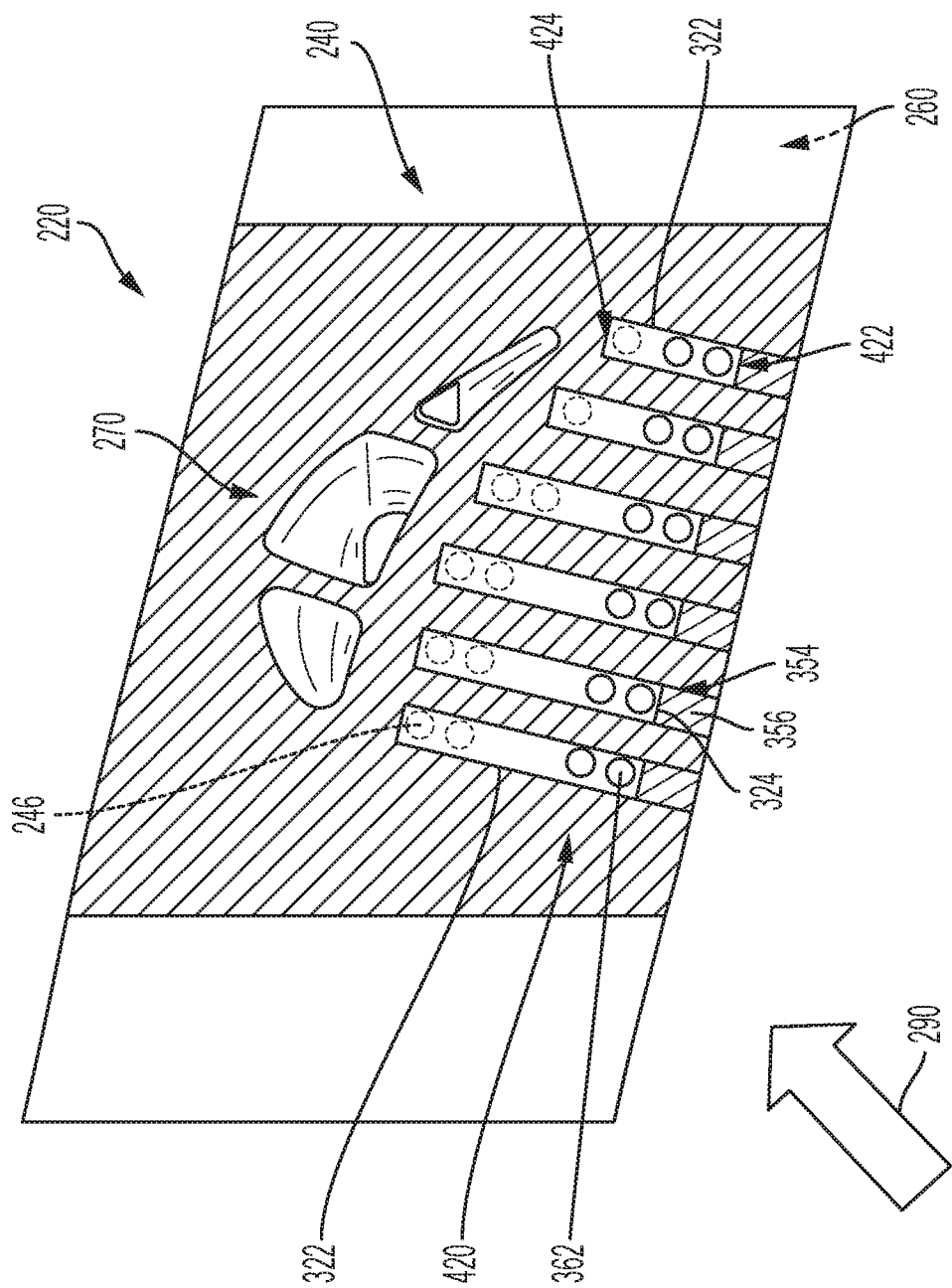
FIG. 4 illustrates a section view of an example of a portion of a blade taken on section line B-B in FIG. 2.

FIG. 4 illustrates a section view of an example of a portion of a blade taken on section line B-B in FIG. 2. In FIG. 4, the illustrated cross-section of the platform 220 includes multiple linear fluid passageways 322. In this example, six independent fluid passages 420 are illustrated as having a single segment provided by the illustrated linear fluid passageways 322 extending from inlet apertures 362 to outlet apertures 246 to cool the platform 220. In other examples, fewer or greater numbers of fluid passages 420 may be present. Each one of the linear fluid passageways 322 may be sealed by a respective plug 356 at the closed end 324 of the linear fluid passageway 322. A first end 422 of the linear fluid passageway 322 may be disposed at the closed end 324 of the linear fluid passageway 322. Fluid, such as secondary air 290, flows through the inlet apertures 362 disposed in the radially inward surface 260 at the closed end 324 of the linear fluid passageway 322. The fluid flows away from the closed end 324 and plug 356, absorbs heat from the platform 220 and is discharged through outlet apertures 256 disposed in the radially outward surface 240. The outlet apertures 246 may be disposed at the second end 424 of the linear fluid passageway 322 opposite the closed end 324 and respective plug 356 such that fluid flows away from the respective plug 356 to the outlet apertures 246 as additional heat is absorbed.

FIGS. 5-12 illustrate exemplary embodiments where each independent fluid passage includes a number of segments, each formed by multiple linear fluid passageways 322.

Figure 5:
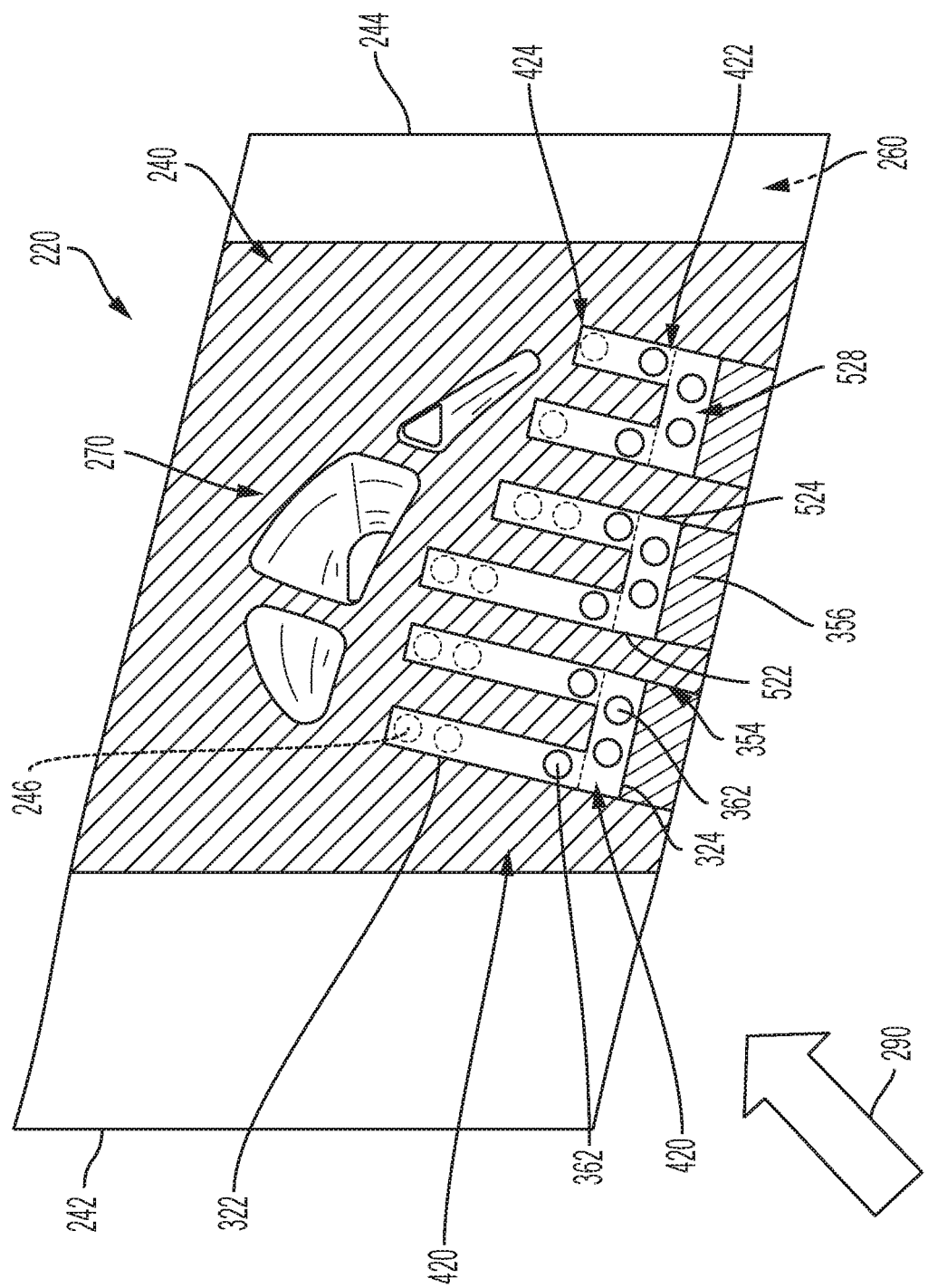
FIG. 5 illustrates a section view of another example of a portion of a blade taken on section line B-B in FIG. 2.

FIG. 5 illustrates a section view of another example of a portion of a blade taken on section line B-B in FIG. 2. In the example of the cross section of the platform 220 in FIG. 5, each of three fluid passageways 420 have three segments which are linear fluid passageways 322. In other examples, additional or fewer fluid passages 420 may be included, and/or fewer or greater numbers of segments may be included in each fluid passage 420. Included in the segments is a linear fluid passageway 322 which is a common header 528 between two sequentially aligned other segments, which are linear fluid passageways 322. The common header 528 may be an extension of the access duct 354 that extends into the platform 220 from the plug 356. The common header 528 may have the same as, or different predetermined cross-sectional area as the access duct 354 and/or the plug 356. For example, where the access duct 354 and plug 356 are circular, the common header 528 may be the same diameter as the access duct 354 and/or plug 356, or the common header 528 may have a different predetermined diameter. The common header 528 may have varying cross-sectional areas.

The common header 528 may be disposed at the closed end 324 of the respective linear fluid passageways 322 where the access duct 354 is sealed by the plug 356. Accordingly, during manufacture, multiple of the linear fluid passageways 322 may be formed via access through the common header 528. The common header 528 may have a leading end 522 and a trailing end 524, wherein the leading end 522 is opposite the trailing end 524 so that the corresponding linear fluid passageways 322 may be spaced apart in the platform 220 to provide distributed cooling. The leading end 522 may be disposed closer to the leading peripheral edge 242 of the radially outward surface 240, and the trailing end 524 may be disposed closer to the trailing peripheral edge 244 of the radially outward surface 240 of the platform 220 such that corresponding upstream and downstream linear fluid passageways 322 may be created from the common header 528.

The common header 528 may be in fluid communication with the first end 422 of multiple of the linear fluid passageways 322. One or more linear fluid passageways 322 may extend from the same common header 528 to distribute the cooling fluid. In examples, one or more linear fluid passageways 322 may extend into the platform 220 perpendicularly from the common header 528 as illustrated. Alternatively, or in addition, one or more of the linear fluid passageways 322 may extend into the platform 220 at an oblique angle relative to the common header 528. The linear fluid passageways 322 extending from the same common header 528 may extend along a straight line through the platform in the same or different directions. One of the linear fluid passageways 322 may extend from the leading end 522 of the common header 528, and second one of the linear fluid passageways 322 may extend from the trailing end 524 of the common header to form a sequential series of segments 420. The common header 528 may include one or more inlet apertures 362 formed in the radially inward surface 260 of the platform 220. Fluid, such as secondary air 290, may flow into the inlet apertures 362 disposed in the common header and/or the first end 422 of the linear fluid passageways 322. The fluid may flow through the linear fluid passageways 322 extending away from the common header 528 and the plug 356, and discharge from the outlet apertures 246 at the second end 424 of the respective linear fluid passageways 322.

Figure 6:
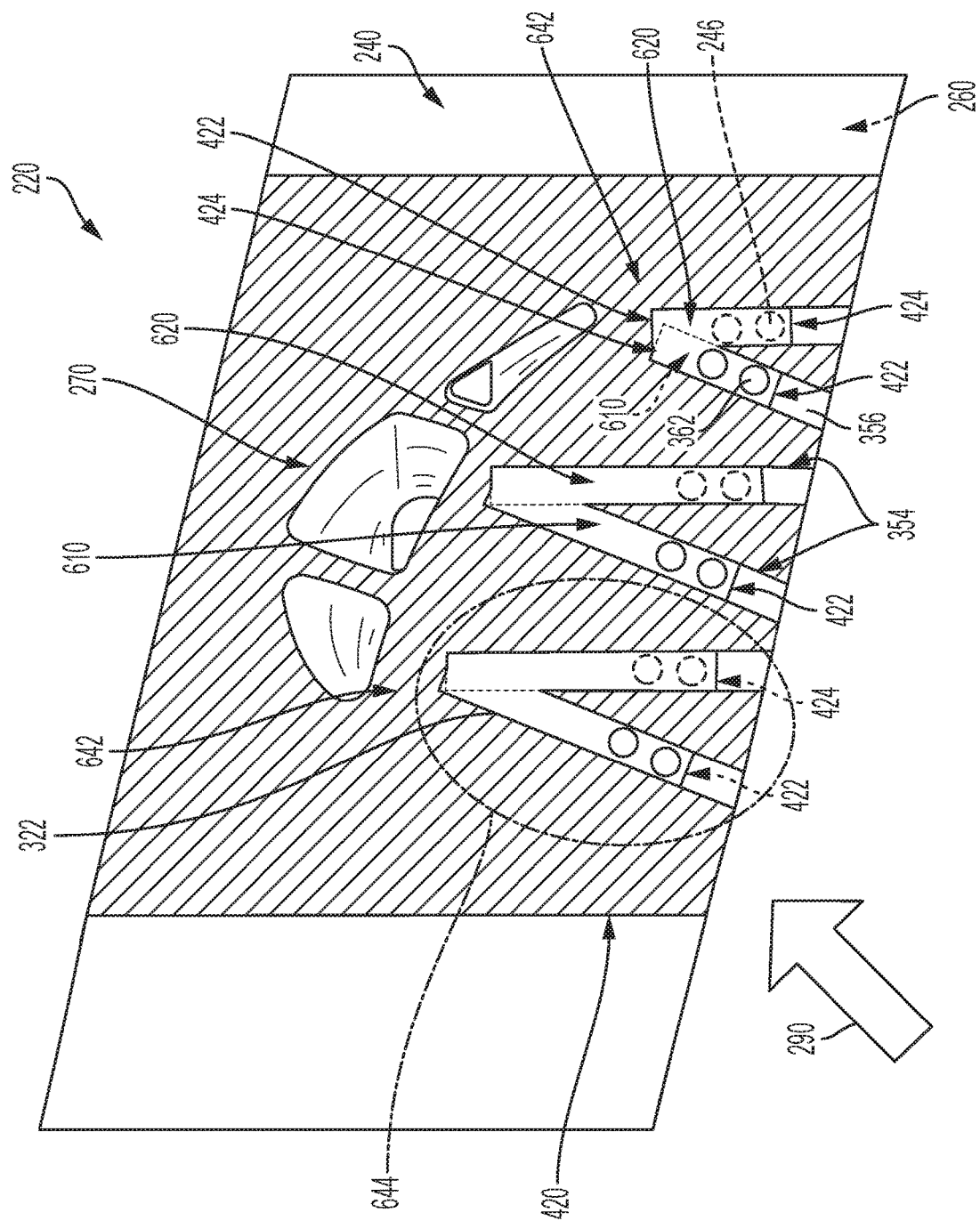
FIG. 6 illustrates a section view of another example of a portion of a blade taken on section line B-B in FIG. 2.

FIG. 6 illustrates a section view of another example of a portion of a blade taken on section line B-B in FIG. 2. In the example of the cross section of the platform 220 in FIG. 6, three independent fluid passages 420 are illustrated with two segments formed by sequentially interconnected linear fluid passageways 322. In other examples, fewer or additional fluid passages 420 may be included, with fewer or greater numbers of segments. The linear fluid passageways 322 may extend into the platform 220 in a distributed fashion toward the cooling passages 270 from different access ducts 354 as illustrated. The linear fluid passageways 322 may be in fluid communication with each other at an intersection 642 of two or more linear fluid passageways 322. The intersection 642 of the linear fluid passageways 322 may be formed by the linear fluid passageways 322 intersecting at an angle with respect to each other by mechanical removal of the material from the platform 220, or a combination of ALM and mechanical removal of the material from the platform 220.

As illustrated in the example of FIG. 6, the linear fluid passageways 322 may include a first linear fluid passageway 610 and a second linear fluid passageway 620. The first linear fluid passageway 610 and the second linear fluid passageway 620 may extend in different directions in order to intersect within the platform 220 and complete the fluid passageway 420. The inlet apertures 362 may be disposed at the first end 422 of the first linear fluid passageway 610. The second end 424 of the first linear fluid passageway 610 may be formed to be in fluid communication with the first end 422 of the second linear fluid passageway 620. The fluid connection of the second end of the first linear fluid passageway 610 and the first end 422 of the second linear fluid passageway 620 may be at the intersection 642. The first linear fluid passageway 610 in fluid communication with the second linear fluid passageway 620 via an intersection 642 may form a pair of segments 644 of the fluid passage 420. The outlet apertures 246 may be disposed at the second end 424 of the second linear fluid passageway 620. Fluid, such as secondary air 290, may enter the linear fluid passageway 322 through the inlet apertures 362 at the first end 422 of the first linear fluid passageway 610, flow through the first linear fluid passageway 610 to the second linear fluid passageway 620 via the intersection 642 while absorbing heat from the platform 220, and discharge heated fluid from outlet apertures 246 disposed at the second end 424 of the second fluid passageway segment 620 into the combustion path. The fluid may experience a sharp or abrupt change of direction as the fluid flows through the intersection 642 so as to achieve distributed cooling of the platform 220.

Figure 7:
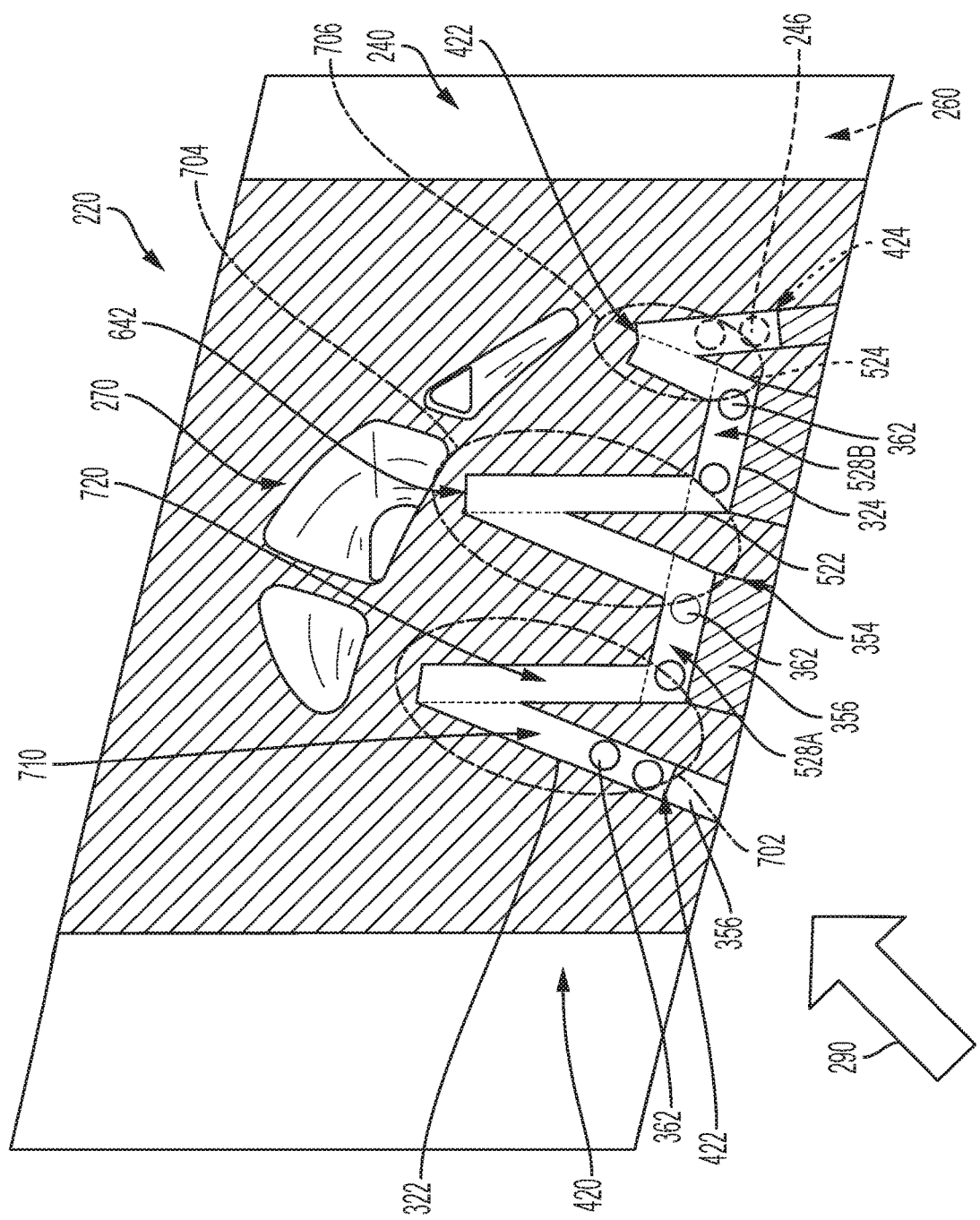
FIG. 7 illustrates a section view of another example of a portion of a blade taken on section line B-B in FIG. 2.

FIG. 7 illustrates a section view of another example of a portion of a blade taken on section line B-B in FIG. 2. In the example of the cross section of the platform 220 in FIG. 7, a single fluid passage 420 is illustrated having eight segments formed by eight respective linear fluid passageways 322, two of which are common headers 528. In other examples, additional fluid passages 420 may be included, and/or fewer or greater numbers of segments may be included in a respective fluid passage 420. The linear fluid passageways 322, including the common headers 528 are sequentially linked as segments to form the fluid passages 420.

As illustrated in FIG. 7, the inlet apertures 362 may be disposed at one or more closed ends 324 of the linear fluid passageways 322 sealed by plugs 356. One or more of the first end 422 of the linear fluid passageways 322 may be accessibly formed at the one or more closed ends 324. The inlet apertures 362 and the one or more common header 528 may also be accessibly formed at the one or more closed ends 324. In an example, the common header 528 may be formed by mechanical removal of material from the platform 220. Additionally or alternatively, the common header 528 may be created by ALM and/or a combination of ALM and a mechanical material removal process. The common header 528 may be created by ALM to decrease machining time. The one or more inlet apertures 362 may be disposed in one or more of the common headers 528 in fluid communication therewith.

The example of FIG. 7 includes a first pair of segments 702, a second pair of segments 704, and a third pair of segments 706 and multiple common headers 528A and 528B formed as the fluid passage 420. In the first pair of segments 702, a first linear fluid passageway 710 includes inlet apertures 362, and a second linear fluid passageway 720 provides a closed flow path to a first common header 528A. The second pair of segments 704 are linear fluid passageways 322 providing convection cooling of the platform 220 by providing closed flow paths between the first common header 528A and the second common header 528B. The third pair of segments 706 includes a closed flow path linear liquid passageway 322 and a linear fluid passageway 322 that includes outlet apertures 246. Each of the pairs of segments and the common headers may formed by mechanical removal of material from the platforms via the be accessed via the access ducts 354 prior to installation of the respective plugs 356. Additionally or alternatively, the pairs of segments and the common headers may be created by ALM and/or a combination of ALM and a mechanical material removal process. The pairs of segments and the common headers may be created by ALM to decrease machining time.

During operation, the first pair of segments 702 provide a cooling flow path through the platform 220 from the inlet apertures 362 in the first linear fluid passageway 710 to the common header 528A where additional cooling fluid is introduced via inlet apertures 362 to mix with the cooling fluid that absorbed heat in the first pair of segments 702. The second linear liquid passageway 720 of the first pair of segments 702 may extend from the leading end 522 of the common header 528A, and the linear liquid passageway of the second pair of segments 704 may extend from the trailing end 524 of the common header 528A. Fluid may flow from the inlet apertures 362 in the first common header 528A away from the corresponding plug 356 into the second pair of segments 704, which are in fluid communication with the second common header 528B. Additional cooling fluid may enter the inlet apertures 362 in the second common header 358B, and fluid may then flow through the second common header 528B and away from the corresponding plug 356 into the third pair of segments 706 to absorb additional heat from the platform 220. The outlet apertures 246 may be disposed at the second end 424 of the linear liquid passageway 322 in the third pair of segments 706. The fluid may continue to flow through the sequentially connected pairs of segments 702, 704 and 706 and common headers 528A and 528B until it reaches the outlet apertures 246 of the linear fluid passageway 322 in the third common header 706.

FIGS. 8-12 illustrate embodiments where the linear fluid passageways 322 include respective inlet apertures 362 on the interior surface 272 of the blade 200, instead of inlet apertures 362 on the radially inward surface 260 of the platform 220 as in FIGS. 4-7. The features and functionality described with regard to FIGS. 4-7 are fully applicable to the following embodiments and examples described with reference to FIGS. 8-12 unless otherwise indicated. Accordingly, such features and functionality are interchangeable and combinable among the various examples described.

In the example embodiments of FIGS. 8-12, at least some of supply linear fluid passageways 802 may extend through the platform 220 and penetrate the interior wall 272 of the cooling passage 270 to form the inlet apertures 362. Thus, the supply linear fluid passageway(s) 802 may be in fluid communication with one or more respective cooling passages 270. The first end 422 of a respective supply linear liquid passageway 802 may penetrate the interior wall 272 of the cooling passage 270 so that fluid, such as secondary air 290, may flow into the linear fluid passageways 322 from the cooling passage 270.

Figure 8:
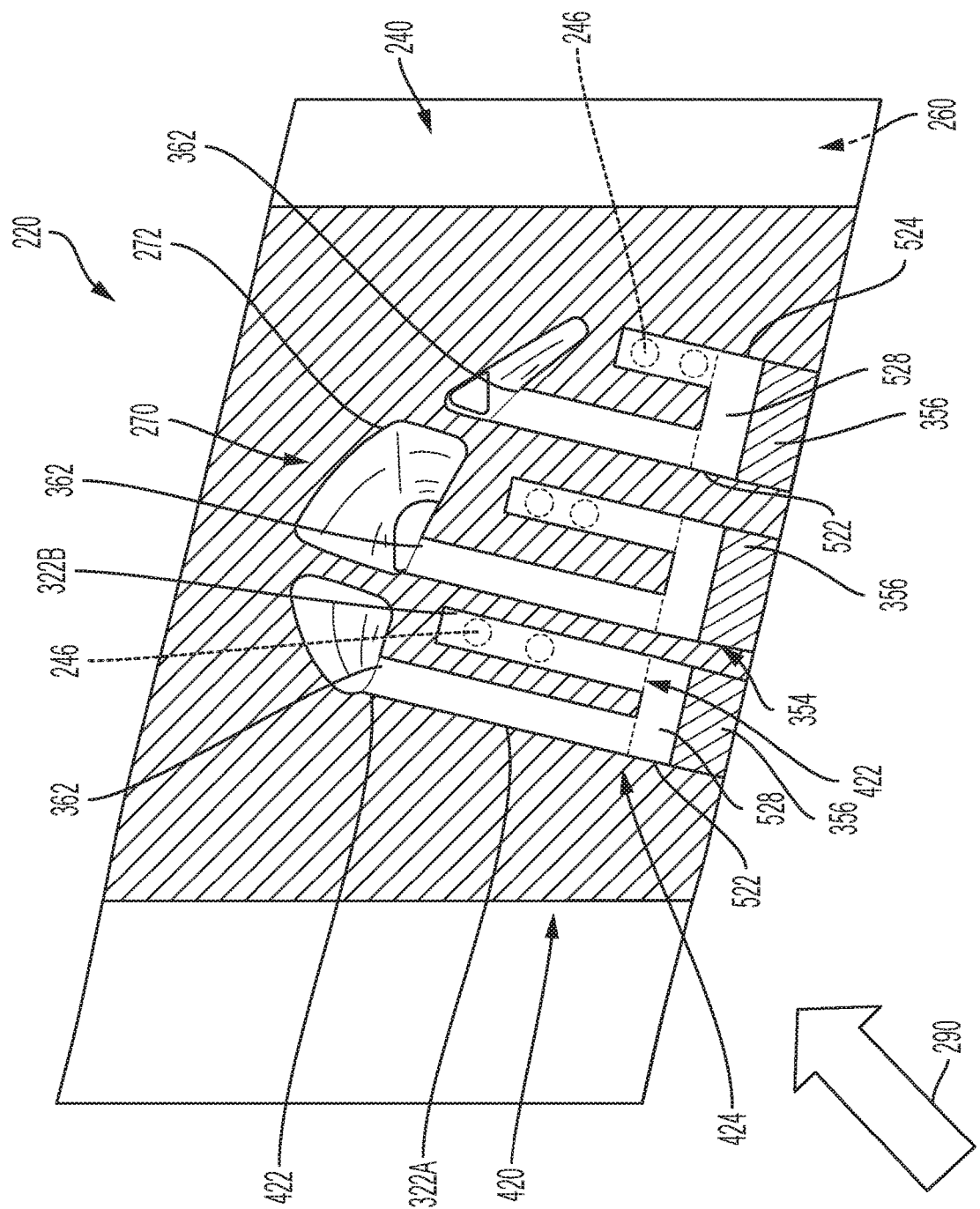
FIG. 8 illustrates a section view of another example of a portion of a blade taken on section line B-B in FIG. 2.

FIG. 8 illustrates a section view of another example of a portion of a blade taken on section line B-B in FIG. 2. In the example of the cross section of the platform 220 in FIG. 8, three fluid passages 420 each include three segments formed by linear fluid passageways 322. Thus, each fluid passage 420 includes a supply linear fluid passageway 322A, a common header 528 and an exhaust linear fluid passageway 322B. In other examples, additional fluid passages 420 may be included, and/or fewer or greater numbers of segments may be included in a respective fluid passage 420. One or more of the linear fluid passageways 322 may extend from the same common header 528. The linear fluid passageways 322 may extend in different directions or the same direction.

In each of the fluid passages 420 illustrated in FIG. 8, the supply linear fluid passageway 322A may penetrate the interior wall 272 of the blade 200 into a separate cavity of the cooling passage 270. Accordingly, each of the fluid passages 420 may have a separate supply of cooling fluid. The supply linear fluid passageway 322A may extend from the respective separate cavities of the cooling passage 270 to the common header 528. The second end 424 of the supply linear fluid passageways 322A may be in fluid communication with the leading end 522 of the common header 528. The first end 422 of the exhaust linear fluid passageway 322B may be in fluid communication with the trailing end 524 of the common header 528. Fluid, such as secondary air 290, may flow in to the first end 422 of the supply linear fluid passageway 322A, through the header 528 and away from the plug 356 to the exhaust linear fluid passageway 322B for discharge through the outlet apertures 246 disposed in the exhaust linear fluid passageway 322A.

Access to form the supply linear fluid passageway 322A and the exhaust linear fluid passageway 322B may be provided via the respective access duct 354 for each of the fluid passages 420. From the respective access duct 354, material may be mechanically removed from the platform 220, such as by drilling, to form the common header 528. The supply linear fluid passageway 322A and the exhaust linear fluid passageway 322B may be formed by mechanical removal of material from the platform 220 via the access duct 354 and the common header 528. Additionally or alternatively, the supply linear fluid passageway 322A and the exhaust linear fluid passageway 322B may be created by ALM and/or a combination of ALM and a mechanical material removal process. The supply linear passageway 322A and the exhaust linear fluid passageway 322B may be created by ALM to decrease machining time. Once the linear fluid passageways 322 are completed, the plug 356 may be installed in the access duct 354.

Figure 9:
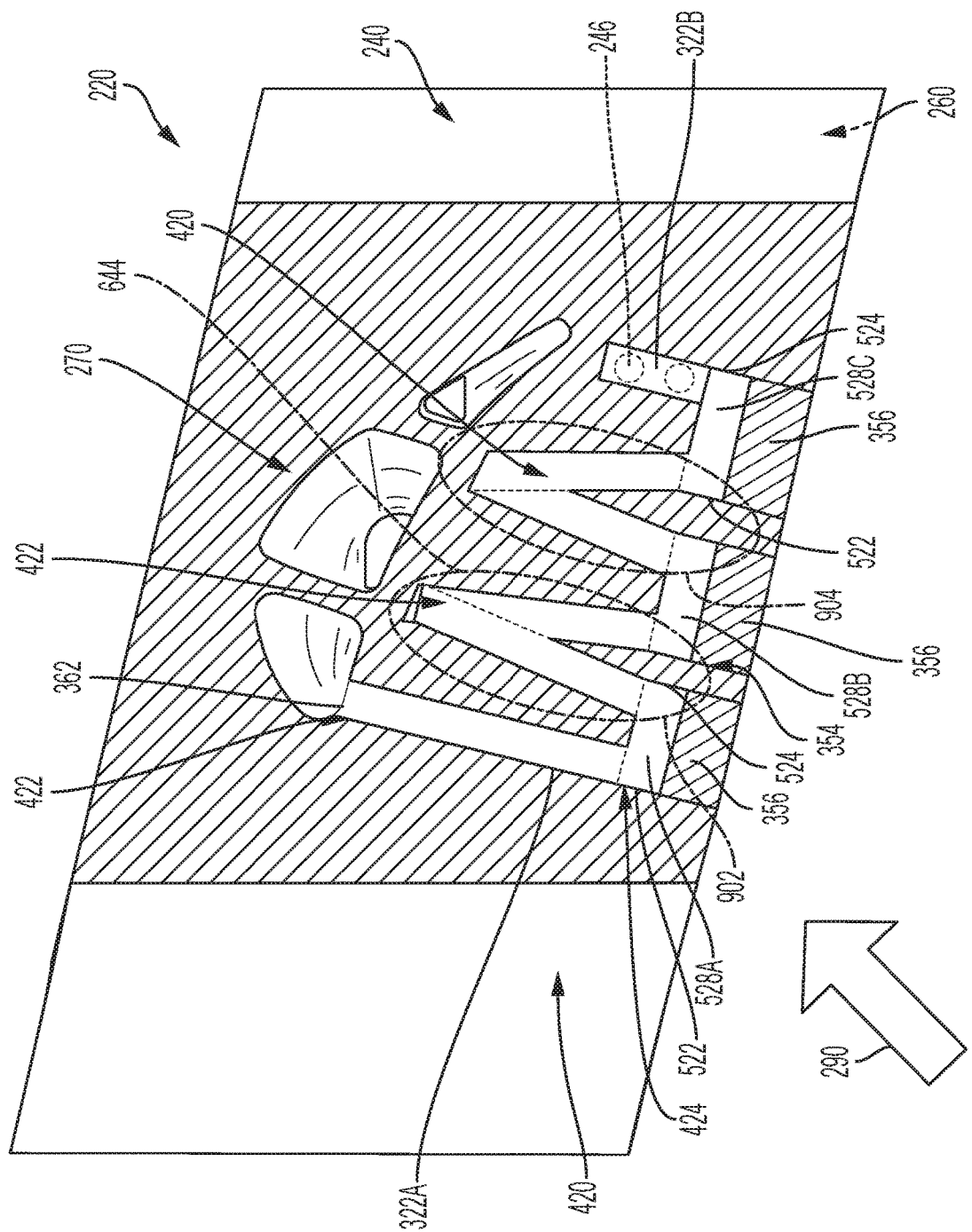
FIG. 9 illustrates a section view of another example of a portion of a blade taken on section line B-B in FIG. 2.

FIG. 9 illustrates a section view of another example of a portion of a blade taken on section line B-B in FIG. 2. In the example of the cross section of the platform 220 in FIG. 9, a single fluid passage 420 is illustrated having 9 segments which are linear fluid passageways 322. The linear fluid passageways 322 include a supply linear fluid passageway 322A, a first common header 528A, a first pair of segments 902, a second common header 528B, a second pair of segments 904, a third common header 528C, and an exhaust linear fluid passageway 322B. In other examples, additional fluid passages 420 may be included, and/or fewer or greater numbers of segments may be included in a respective fluid passage 420. The linear fluid passageways 322, including the common headers 528 are sequentially linked as segments to form the fluid passage 420.

The supply linear fluid passageway 322A may include the inlet aperture 362 and may be a single supply of cooling fluid to the fluid passage 420. The supply linear fluid passageway 322A may be in fluid communication with the common headers 528, the pairs of segments 902, 904 and 906, and the exhaust linear fluid passageway 322A such that cooling fluid may flow through the platform 220 and away from plugs 356 to the outlet apertures 246. Fluid, such as secondary air 290, may absorb heat from various areas of the platform 220 as the fluid is channeled through the fluid passage 420 to the outlet apertures 246. Access to form the fluid passage 420 illustrated in FIG. 9 may be via the access ducts 354 to perform mechanical removal of material to form the common headers 528A, 528B and 528C. The supply linear fluid passageway 322A may be formed by mechanical removal of material, or by a combination of ALM and mechanical removal of material, between the first common header 528A and the cooling passage 270. The pair of segments 902 and 904 may be formed by mechanical removal of material, or by a combination of ALM and mechanical removal of material, from different access ducts 354 along intersecting vectors to form the flow passage therethrough, and the exhaust linear fluid passageway 322B may be formed by mechanical removal of material, or by a combination of ALM and mechanical removal of material, via the third common header 528C.

Figure 10:
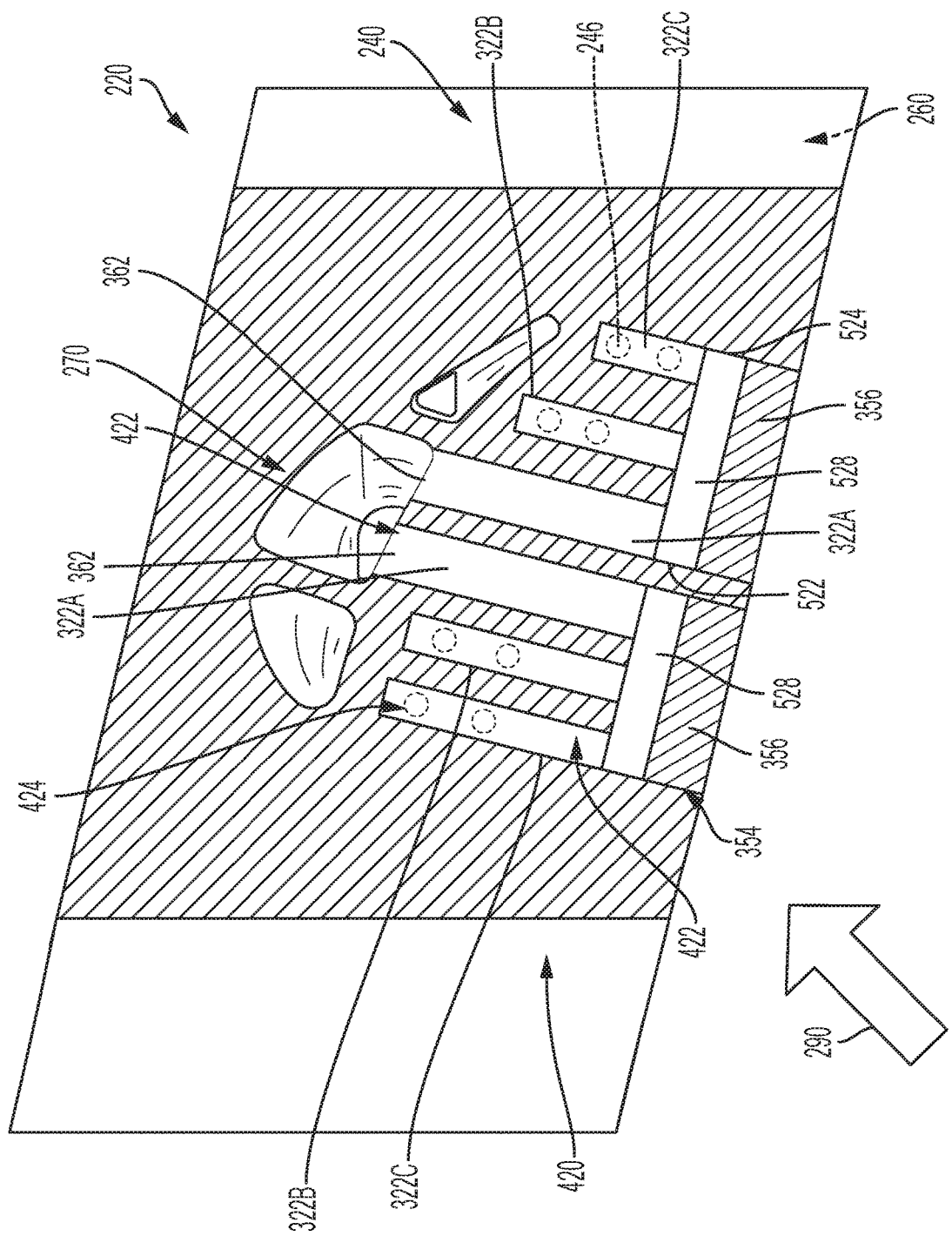
FIG. 10 illustrates a section view of another example of a portion of a blade taken on section line B-B in FIG. 2.

FIG. 10 illustrates a section view of another example of a portion of a blade taken on section line B-B in FIG. 2. In the example of the cross section of the platform 220 in FIG. 10, two fluid passages 420 each having four segments provided by the linear fluid passageways 322 are illustrated. In other examples, additional or fewer fluid passages 420 may be included, and/or fewer or greater numbers of segments may be included in a respective fluid passages 420. The linear fluid passageways 322, including the common headers 528, are linked as segments to form the fluid passages 420.

The linear fluid passageways 322 in each of the fluid passages 420 of FIG. 10 include a common header 528 in fluid communication with a supply linear fluid passageway 322A, a first exhaust linear fluid passageway 322B and a second exhaust linear fluid passageway 322C. The supply linear fluid passageway 322A of each of the flow passages 420 may be supplied from the same cavity in the cooling passage 270 such that uniform flow of cooling liquid will be supplied to each of the flow passages 420. The supply linear fluid passageway 322A may be larger in cross-sectional area than the corresponding exhaust linear fluid passageways 322B since the supply linear fluid passageway 322A is supplying multiple exhaust linear fluid passageway 322B via the respective common header 528.

Each of the supply linear fluid passageway 322A, the first exhaust linear fluid passageway 322B and the second exhaust linear fluid passageway 322C are formed as perpendicular passageways with respect to the common header 528 by mechanical removal of material via the access duct 354, or by a combination of ALM and mechanical removal of material via the access duct 354. The supply linear fluid passageway 322A and the second exhaust linear passageway 322C may extend from the leading end 522 and/or trailing end 524 of the common header 528. The first exhaust linear fluid passageway 322B may extend from a central area of the common header 528 disposed between the leading end 522 and trailing end 524. The linear fluid passageways 322 may extend from the common header 528 in parallel such that fluid flowing from the supply linear fluid passageway 322A into the common header 528 can flow away from the plug 356 into either or both of the exhaust linear fluid passageways 322B and 322C in a non-sequential manner. Accordingly, fluid such, as secondary air 290, may flow into the supply linear fluid passageway 322A through the common header 528, and away from the plug 356 into either of the first and second exhaust linear fluid passageways 322B and 322C.

Figure 11:
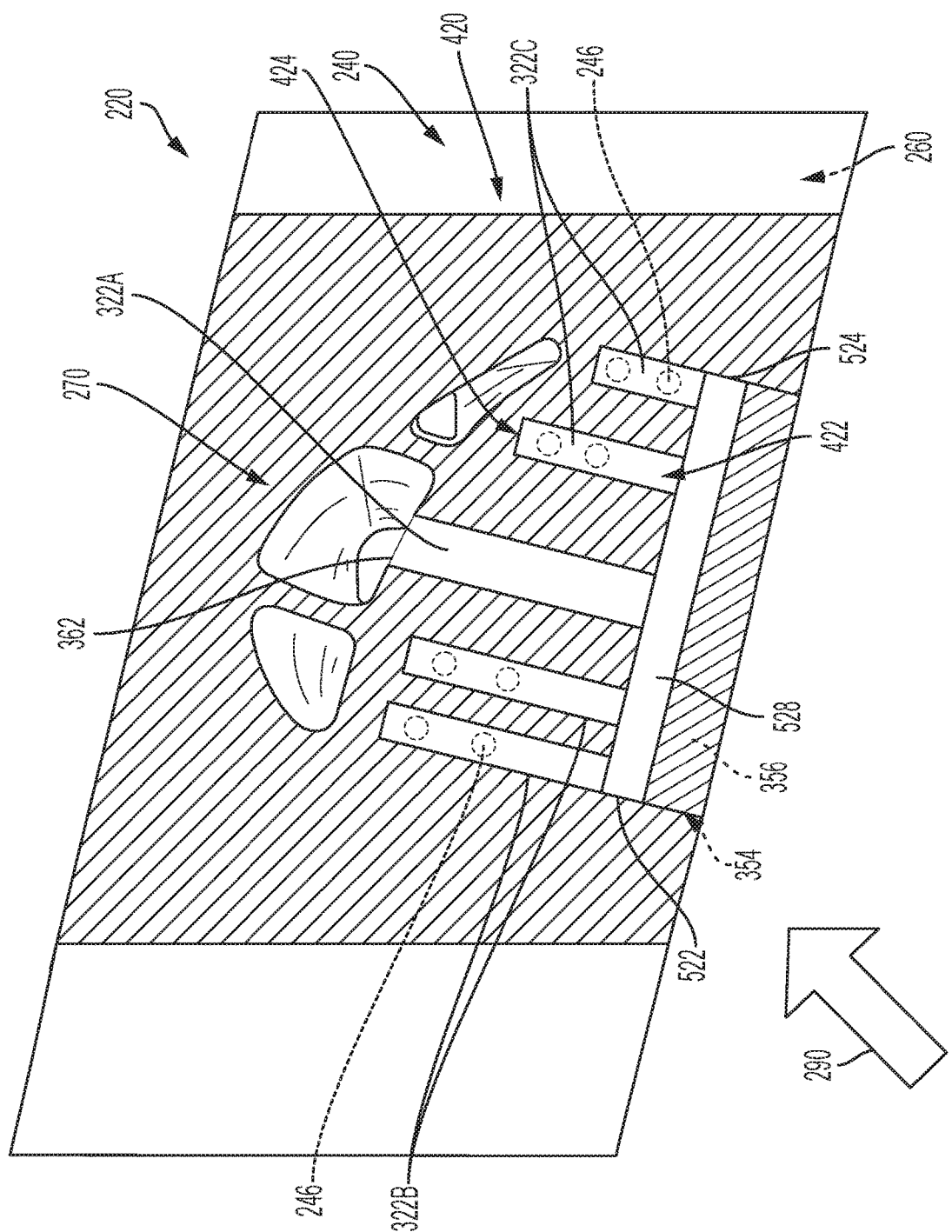
FIG. 11 illustrates a section view of another example of a portion of a blade taken on section line B-B in FIG. 2.

FIG. 11 illustrates a section view of another example of a portion of a blade taken on section line B-B in FIG. 2. In the example of the cross section of the platform 220 in FIG. 11, a single fluid passage 420 having six segments provided by the linear fluid passageways 322 is illustrated. In other examples, additional or fewer fluid passages 420 may be included, and/or fewer or greater numbers of segments may be included in a respective fluid passages 420. The linear fluid passageways 322, include a supply linear fluid passageway 322A, a common header 528 an a number of first exhaust linear fluid passageways 322B and second exhaust linear fluid passageways 322C that are linked as segments to form the fluid passage 420.

The supply linear fluid passageway 322A is disposed in a central portion of the common header 528 between the leading end 522 and the trailing end 524 to supply cooling fluid uniformly to the first exhaust linear fluid passageways 322B and the second exhaust linear fluid passageways 322C being supplied by the common header 528. A portion of the first exhaust linear fluid passageways 322B may be disposed toward the leading end 522 and a portion of the second exhaust linear fluid passageways 322C may be disposed toward the trailing end 524 of the common header 528 to balance the flow of cooling liquid. Fluid may flow from the supply linear fluid passageway 322A past the plug 356 and towards the leading end 522 and trailing end 525 of the common header 528. The fluid may then flow away from the plug 356 into any one of the first exhaust linear fluid passageways 322B and/or the second exhaust linear fluid passageways 322C disposed along the common header 528. The fluid may then be discharged through outlet apertures 246 disposed in the respective linear passageway segment 420.

Access to the common header 528 may be via the duct access 354 to perform mechanical removal of material to form the common header 528, the supply linear fluid passageway 322A and the first exhaust linear fluid passageways 322B and the second exhaust linear fluid passageways 322C. In this example, the supply linear fluid passageway 322A is larger cross-sectional area than the first exhaust linear fluid passageways 322B and the second exhaust linear fluid passageways 322C. In addition, the length, or distance into the platform the different exhaust linear fluid passageways 322B extend is varied according to the location of the cooling passageway 270.

Figure 12:
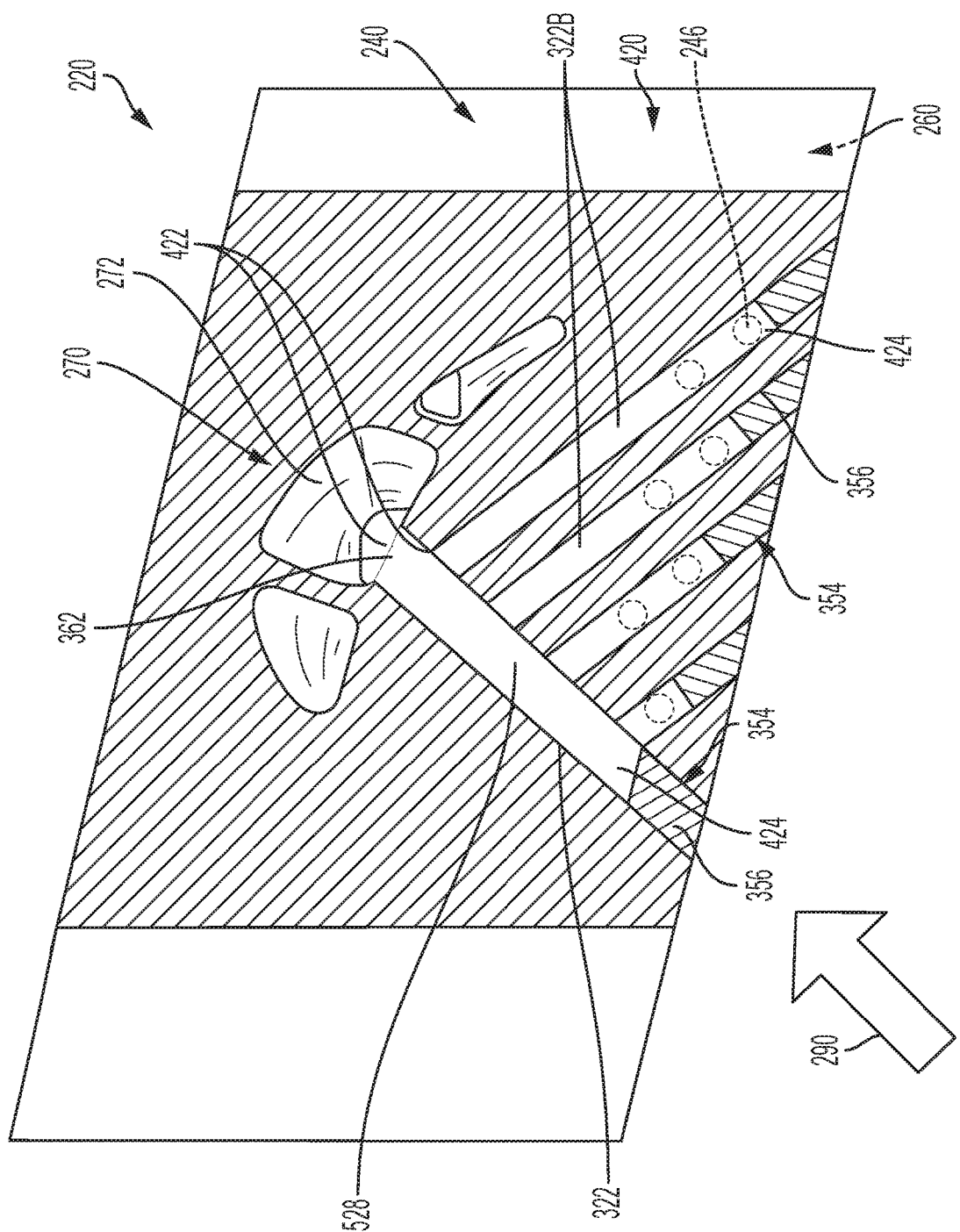
FIG. 12 illustrates a section view of another example of a portion of a blade taken on section line B-B in FIG. 2.

FIG. 12 illustrates a section view of another example of a portion of a blade taken on section line B-B in FIG. 2. In the example of the cross section of the platform 220 in FIG. 12, a single flow passage 420 having five segments provided by the linear fluid passageways 322 are illustrated. In other examples, additional or fewer fluid passages 420 may be included, and/or fewer or greater numbers of segments may be included in a respective fluid passage 420. The linear fluid passageways 322, include the common header 528 and a number of exhaust linear fluid passageways 322B, which are linked as segments to form the fluid passage 420.

In FIG. 12, each of the linear fluid passageways 322 extend from respective access ducts 354 from which the respective linear fluid passageway 322 was formed. The common header 528 is also the supply linear fluid passageway. Thus, the exhaust linear fluid passageways 322B may be coupled with the common header 528 at the first end 422 and extend from the single common header 528 in different directions to cool the platform 220. The outlet apertures 246 may be disposed in the second end 424 of each of the exhaust linear fluid passageways 322B.

The common header 528 may extend from a respective access duct 356 through the platform 220 to the inlet aperture 362 disposed in the interior wall 272. The first end 422 of the common header 528 may be disposed at the inlet aperture 362. The second end of the common header 528 may be disposed at the plug 356 of the respective access duct 354. The first end 422 of each one of the linear passageway segments 322B may be in fluid communication with the common header 528. Fluid, such as secondary air 290, may flow from the inlet aperture 362 to the common header 528. As the fluid flows from the first end 422 to the second end 424 of the common header 528, the fluid may branch off and flow away from the plug 356 of the common header 528 toward any one of the exhaust linear fluid passageways 322B. The fluid may then be discharged out of the outlet apertures 246 of the respective exhaust linear fluid passageways 322B.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a system comprising: an air foil for a combustion turbine, the air foil positionable in a combustion flow path of the combustion turbine; a shank integrally formed with the air foil; and a platform integrally formed with the shank, the platform comprising: a plurality of linear fluid passageways through the platform, a plurality of access ducts penetrating a wedge face surface of the platform, and a plurality of outlet apertures formed in a radially outward surface of the platform in fluid communication with respective linear fluid passageways such that fluid flowing through the respective linear fluid passageways is discharged from the outlet apertures into the combustion flow path; and a plurality of plugs, each of the plugs disposed in a respective one of the access ducts to form a fluid tight seal and be positioned in at least one of the respective linear fluid passageways such that fluid flowing through the respective linear fluid passageways flows away from a respective plug for discharge from a respective outlet aperture into the combustion flow path.

A second aspect relates to the system of aspect 1, further comprising a plurality of inlet apertures formed in the platform and in fluid communication with the linear fluid passageways and the outlet apertures, the inlet apertures penetrating a radially inward surface of the platform, the radially inward surface being an opposing surface to the radially outward surface.

A third aspect relates to the system of any preceding aspect, wherein the inlet apertures are positioned on the platform to receive secondary air of the gas turbine engine in the inlet apertures.

A fourth aspect relates to the system of any preceding aspect, wherein each of the linear fluid passageways are sequentially interconnected circular passageway segments extending in a different direction in the platform.

A fifth aspect relates to the system of any preceding aspect wherein the plurality of linear fluid passageways includes a linear fluid passageway operable as a common header disposed in the platform, and other of the linear fluid passageways extend in different respective directions in the platform away from the common header to a respective outlet aperture.

A sixth aspect relates to the system of any preceding aspect, wherein the plurality of linear fluid passageways include a first linear fluid passageway and a second linear fluid passageway, a second end of the first linear fluid passageway positioned at one or more of the outlet apertures, a first end of the first linear fluid passageway positioned in fluid communication with a second end of the second linear fluid passageway, and a first end of the second linear fluid passageway positioned to receive a supply of secondary air from a gas turbine engine.

A seventh aspect relates to the system of any preceding aspect, wherein the air foil, platform and shank are integrally forged as a monolithic structure, and the linear fluid passageways, access apertures and outlet apertures are formed in the platform by mechanical removal of material from the monolithic structure.

An eight aspect relates to a method comprising: forming an access duct in a wedge face surface of a platform of a blade of a combustion turbine, the blade including a shank and an airfoil extending away from opposing surfaces of the platform, and the wedge face surface formed as a peripheral edge of the platform; mechanically removing material from the platform to form a linear passageway extending away from the access duct into the platform; mechanically removing material from a surface of the platform to form an outlet aperture in fluid communication with the linear passageway; positioning a plug in the access duct to form a closed end of the linear passageway extending away from the access duct; introducing a flow of fluid to the linear passageway, the flow of fluid in the linear passageway being away from the plug to the outlet aperture; and discharging the flow of fluid from the outlet aperture into a combustion flow path of the combustion turbine.

A ninth aspect relates to the method of aspect 8, wherein the opposing surfaces are a radially outward surface of the platform and a radially inward surface of the platform, and the method further comprises mechanically removing material from the radially inward surface of the platform to form an inlet aperture in fluid communication with the linear passageway, the radially inward surface being opposite the radially outward surface.

A tenth aspect relates to the method of any preceding aspect, further comprising receiving secondary air in the inlet aperture from radially inward from the platform, and channeling the secondary air through the linear passageway past the plug to the outlet aperture.

An eleventh aspect relates to the method of any preceding aspect, further comprising mechanically removing material from the shank to form an inlet aperture in fluid communication with the linear passageway and a cooling passage of the blade.

A twelfth aspect relates to the method of any preceding aspect, further comprising receiving secondary air in the inlet aperture from the cooling passage of the blade and channeling the secondary air through the linear passageway past the plug to the outlet aperture.

A thirteenth aspect relates to a system comprising an airfoil for a combustion turbine; a shank coupled with the airfoil; a platform coupled with the shank, the platform comprising a fluid passage in the platform extending between an inlet aperture and an outlet aperture formed in the platform, the fluid passage comprising a linear fluid passageway; an access duct formed in a wedge face surface of the platform, the access duct extending into the linear fluid passageway; and a plug positioned in the access duct to form a fluid tight seal and direct fluid flow in the linear fluid passageway from the inlet aperture, away from the plug, to the outlet aperture.

A fourteenth aspect relates to the system of aspect 13, wherein the linear fluid passageway comprises a plurality of linear fluid passageways, and the inlet aperture is in fluid communication with the outlet aperture through a series of the linear fluid passageways, each of the linear fluid passageways formed by mechanical removal of material from the platform via the access duct.

A fifteenth aspect relates to the system of any preceding aspect, wherein fluid discharged from the outlet aperture is air.

A sixteenth aspect relates to the system of any preceding aspect, wherein the linear fluid passageway comprises a plurality of linear fluid passageways, and the plug is included in the access duct forming a common header between a first linear fluid passageway and a second linear fluid passageway.

A seventeenth aspect relates to the system of any preceding aspect, wherein the inlet aperture is formed between the linear fluid passageway and a cooling passage of the blade such that the linear fluid passageway is in fluid communication with the cooling passage to receive secondary air flowing in the cooling passage.

An eighteenth aspect relates to the system of any preceding aspect, wherein the inlet aperture is formed in a radially inward surface of the platform and the outlet aperture is formed in a radially outward surface of the platform, the radially inward surface of the platform disposed such that secondary air is received by the inlet aperture, and the radially outward surface of the platform positioned in a combustion flow path of the combustion turbine such that secondary air is discharged from the outlet aperture into the combustion flow path.

A nineteenth aspect relates to the system of any preceding aspect, wherein the plug is permanently affixed in the access duct to form a part of the wedge face surface and a wall of the linear fluid passageway with opposing sides of the plug.

A twentieth aspect relates to any of aspect 13 or 15-19, wherein the linear fluid passageway comprises a plurality of linear fluid passageways, and the inlet aperture is in fluid communication with the outlet aperture through a series of the linear fluid passageways, each of the linear fluid passageways formed by additive layer manufacturing of the platform and mechanical removal of material from at least a portion of the respective linear fluid passageways via the access duct.

In addition to the features mentioned in each of the independent aspects enumerated above, some examples may show, alone or in combination, the optional features mentioned in the dependent aspects and/or as disclosed in the description above and shown in the figures.

What is claimed is:

1. A system comprising:
   an air foil for a combustion turbine, the air foil positionable in a combustion flow path of the combustion turbine;
   a shank integrally formed with the air foil; and
   a platform integrally formed with the shank, the platform comprising:
      a plurality of linear fluid passageways through the platform, wherein the plurality of linear fluid passageways includes a linear fluid passageway operable as a common header disposed in the platform, and other of the linear fluid passageways extend in different respective directions in the platform away from the common header to a respective outlet aperture, wherein the plurality of linear fluid passageways includes a linear fluid passageway operable as a common header disposed in the platform, and other of the linear fluid passageways extend in the platform away from the common header to a respective outlet aperture,
      a plurality of access ducts penetrating a wedge face surface of the platform, and
      a plurality of outlet apertures formed in a radially outward surface of the platform in fluid communication with respective linear fluid passageways such that fluid flowing through the respective linear fluid passageways is discharged from the outlet apertures into the combustion flow path; and
      a plurality of plugs, each of the plugs disposed in a respective one of the access ducts to form a fluid tight seal and be positioned in at least one of the respective linear fluid passageways such that fluid flowing through the respective linear fluid passageways flows away from a respective plug for discharge from a respective outlet aperture into the combustion flow path.

2. The system of claim 1, further comprising a plurality of inlet apertures formed in the platform and in fluid communication with the linear fluid passageways and the outlet apertures, the inlet apertures penetrating a radially inward surface of the platform, the radially inward surface being an opposing surface to the radially outward surface.

3. The system of claim 2, wherein the inlet apertures are positioned on the platform to receive secondary air of the gas turbine engine in the inlet apertures.

4. A system comprising:
   an air foil for a combustion turbine, the air foil positionable in a combustion flow path of the combustion turbine;
   a shank integrally formed with the air foil; and
   a platform integrally formed with the shank, the platform comprising:
      a plurality of linear fluid passageways through the platform, wherein each of the linear fluid passageways are interconnected circular passageway segments extending in a different direction in the platform,
      a plurality of access ducts penetrating a wedge face surface of the platform, and
      a plurality of outlet apertures formed in a radially outward surface of the platform in fluid communication with respective linear fluid passageways such that fluid flowing through the respective linear fluid passageways is discharged from the outlet apertures into the combustion flow path; and
      a plurality of plugs, each of the plugs disposed in a respective one of the access ducts to form a fluid tight seal and be positioned in at least one of the respective linear fluid passageways such that fluid flowing through the respective linear fluid passageways flows away from a respective plug for discharge from a respective outlet aperture into the combustion flow path.

5. The system of claim 1, wherein the other of the linear fluid passageways extend in different respective directions in the platform away from the common header.

6. A system comprising:
   an air foil for a combustion turbine, the air foil positionable in a combustion flow path of the combustion turbine;
   a shank integrally formed with the air foil; and
   a platform integrally formed with the shank, the platform comprising:
      a plurality of linear fluid passageways through the platform, wherein the plurality of linear fluid passageways include a first linear fluid passageway and a second linear fluid passageway, a second end of the first linear fluid passageway positioned at one or more of the outlet apertures, a first end of the first linear fluid passageway positioned in fluid communication with a second end of the second linear fluid passageway, and a first end of the second linear fluid passageway positioned to receive a supply of secondary air from a gas turbine engine, a plurality of access ducts penetrating a wedge face surface of the platform, and a plurality of outlet apertures formed in a radially outward surface of the platform in fluid communication with respective linear fluid passageways such that fluid flowing through the respective linear fluid passageways is discharged from the outlet apertures into the combustion flow path; and a plurality of plugs, each of the plugs disposed in a respective one of the access ducts to form a fluid tight seal and be positioned in at least one of the respective linear fluid passageways such that fluid flowing through the respective linear fluid passageways flows away from a respective plug for discharge from a respective outlet aperture into the combustion flow path.

7. The system of claim 1, wherein the air foil, platform and shank are integrally forged as a monolithic structure, and the linear fluid passageways, access apertures and outlet apertures are formed in the platform by mechanical removal of material from the monolithic structure.

8. A method comprising:

forming a plurality of access ducts in a wedge face surface of a platform of a blade of a combustion turbine, the blade including a shank and an airfoil extending away from opposing surfaces of the platform, and the wedge face surface formed as a peripheral edge of the platform;

mechanically removing material from the platform to form a plurality of linear passageways such that each of the linear passageways are interconnected circular passageway segments extending in a different direction in the platform, each of one or more of the linear passageways extending away from a respective access duct into the platform;

mechanically removing material from a surface of the platform to form a plurality of outlet apertures in fluid communication with one or more respective linear passageways;

positioning a respective plug in each respective access duct to form a closed end of one or more of the linear passageways extending away from the respective access duct;

introducing a flow of fluid to the linear passageways, the flow of fluid in the linear passageways being away from the respective plug to respective outlet aperture; and discharging the flow of fluid from the respective outlet aperture into a combustion flow path of the combustion turbine.

9. The method of claim 8, wherein the opposing surfaces are a radially outward surface of the platform and a radially inward surface of the platform, and the method further comprises mechanically removing material from the radially inward surface of the platform to form an inlet aperture in fluid communication with the linear passageways, the radially inward surface being opposite the radially outward surface.

10. The method of claim 9, further comprising receiving secondary air in the inlet aperture from the radially inward surface of the platform, and channeling the secondary air through the linear passageways past the respective plug to the respective outlet aperture.

11. The method of claim 8, further comprising mechanically removing material from the shank to form an inlet aperture in fluid communication with the linear passageways and a cooling passage of the blade.

12. The method of claim 11, further comprising receiving secondary air in the inlet aperture from the cooling passage of the blade and channeling the secondary air through the linear passageways past the respective plug to the respective outlet aperture.

13. A system comprising an airfoil for a combustion turbine;

a shank coupled with the airfoil;

a platform coupled with the shank, the platform comprising a fluid passage in the platform extending between an inlet aperture and an outlet aperture formed in the platform, the fluid passage comprising a linear fluid passageway;

an access duct formed in a wedge face surface of the platform, the access duct extending into the linear fluid passageway; and a plug positioned in the access duct to form a fluid tight seal and direct fluid flow in the linear fluid passageway from the inlet aperture, away from the plug, to the outlet aperture, wherein the linear fluid passageway comprises a plurality of linear fluid passageways, and the plug is included in the access duct forming a common header between a first linear fluid passageway and a second linear fluid passageway.

14. The system of claim 13, wherein the inlet aperture is in fluid communication with the outlet aperture through a series of the linear fluid passageways, each of the linear fluid passageways formed by mechanical removal of material from the platform via the access duct.

15. The system of claim 13, wherein fluid discharged from the outlet aperture is air.

16. The system of claim 13, wherein the inlet aperture is formed between the linear fluid passageway and a cooling passage of the blade such that the linear fluid passageway is in fluid communication with the cooling passage to receive secondary air flowing in the cooling passage.

17. The system of claim 13, wherein the inlet aperture is formed in a radially inward surface of the platform and the outlet aperture is formed in a radially outward surface of the platform, the radially inward surface of the platform disposed such that secondary air is received by the inlet aperture, and the radially outward surface of the platform positioned in a combustion flow path of the combustion turbine such that secondary air is discharged from the outlet aperture into the combustion flow path.

18. The system of claim 13, wherein the plug is permanently affixed in the access duct to form a part of the wedge face surface and a wall of the linear fluid passageway with opposing sides of the plug.

19. The system of claim 13, wherein the inlet aperture is in fluid communication with the outlet aperture through a series of the linear fluid passageways, each of the linear fluid passageways formed by additive layer manufacturing of the platform and mechanical removal of material from at least a portion of the respective linear fluid passageways via the access duct.

* * * * *